US012586363B2

(12) United States Patent
Hasegawa et al.

(10) Patent No.: US 12,586,363 B2
(45) Date of Patent: Mar. 24, 2026

(54) GENERATION OF PLURAL IMAGES HAVING M-BIT DEPTH PER PIXEL BY CLIPPING M-BIT SEGMENTS FROM MUTUALLY DIFFERENT POSITIONS IN IMAGE HAVING N-BIT DEPTH PER PIXEL

(71) Applicant: CANON KABUSHIKI KAISHA, Tokyo (JP)

(72) Inventors: Hiroyuki Hasegawa, Chiba (JP); Koki Nakamura, Tokyo (JP); Shunsuke Kawahara, Tokyo (JP); Kazuki Hosoi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 564 days.

(21) Appl. No.: 17/991,910

(22) Filed: Nov. 22, 2022

(65) Prior Publication Data

US 2023/0169761 A1     Jun. 1, 2023

(30) Foreign Application Priority Data

Dec. 1, 2021     (JP) ................................. 2021-195650

(51) Int. Cl.
　　*G06V 10/82*　　　(2022.01)
　　*G06T 5/50*　　　(2006.01)
　　　　　　(Continued)
(52) U.S. Cl.
　　CPC ................ *G06V 10/82* (2022.01); *G06T 5/50* (2013.01); *G06T 7/11* (2017.01); *G06V 10/60* (2022.01);
　　　　　　(Continued)
(58) Field of Classification Search
　　CPC .... G06V 10/82; G06V 10/60; G06V 2201/07; G06V 10/776; G06V 10/774; G06T 5/50;
　　　　　　(Continued)

(56) References Cited

U.S. PATENT DOCUMENTS

2012/0293620 A1* 11/2012 Pahalawatta ........... H04N 19/33
　　　　　　　　　　　　　　　　348/43
2017/0270408 A1*  9/2017 Shi ........................... G06N 3/04
　　　　　　　　(Continued)

FOREIGN PATENT DOCUMENTS

JP　　　2018-077786 A　　5/2018
JP　　　2019-121252 A　　7/2019
WO　　WO-2020190928 A1 *  9/2020　........... H04N 13/111

OTHER PUBLICATIONS

A Little Bit More: Bitplane-Wise Bit-Depth Recovery, by Punnappurath, Abhijith, Brown, Michael S., Pub. IEEE Transactions on Pattern Analysis and Machine Intelligence, doi: 10.1109/TPAMI.2021.3125692 May 3, 2020 (Year: 2020).*

*Primary Examiner* — Ping Y Hsieh
*Assistant Examiner* — Heath E. Wells
(74) *Attorney, Agent, or Firm* — Venable LLP

(57) ABSTRACT

An image processing apparatus including a first generation unit configured to generate a plurality of images having an M-bit depth per pixel by inputting an input image having a bit depth of N bits, and clipping M-bit segments from mutually different positions within the N bits; a second generation unit including a neural network for an M-bit-depth image and configured to generate, by inputting the plurality of images generated by the first generation unit into the neural network, a plurality of output images corresponding to each of the plurality of images being input; and a third generation unit configured to generate an image having the N-bit depth from the plurality of output images generated by the second generation unit.

12 Claims, 22 Drawing Sheets

(51) Int. Cl.
  *G06T 7/11* (2017.01)
  *G06V 10/60* (2022.01)
(52) U.S. Cl.
  CPC *G06T 2207/20221* (2013.01); *G06V 2201/07*
  (2022.01)
(58) Field of Classification Search
  CPC ... G06T 7/11; G06T 2207/20221; G06T 5/60;
  G06T 5/70; G06T 2207/20084
  USPC ......................................................... 382/156
  See application file for complete search history.

(56) References Cited

U.S. PATENT DOCUMENTS

| | | | |
|---|---|---|---|
| 2018/0220144 A1* | 8/2018 | Su | H04N 19/70 |
| 2023/0065993 A1* | 3/2023 | Khemka | H04N 19/182 |

* cited by examiner

F I G. 1
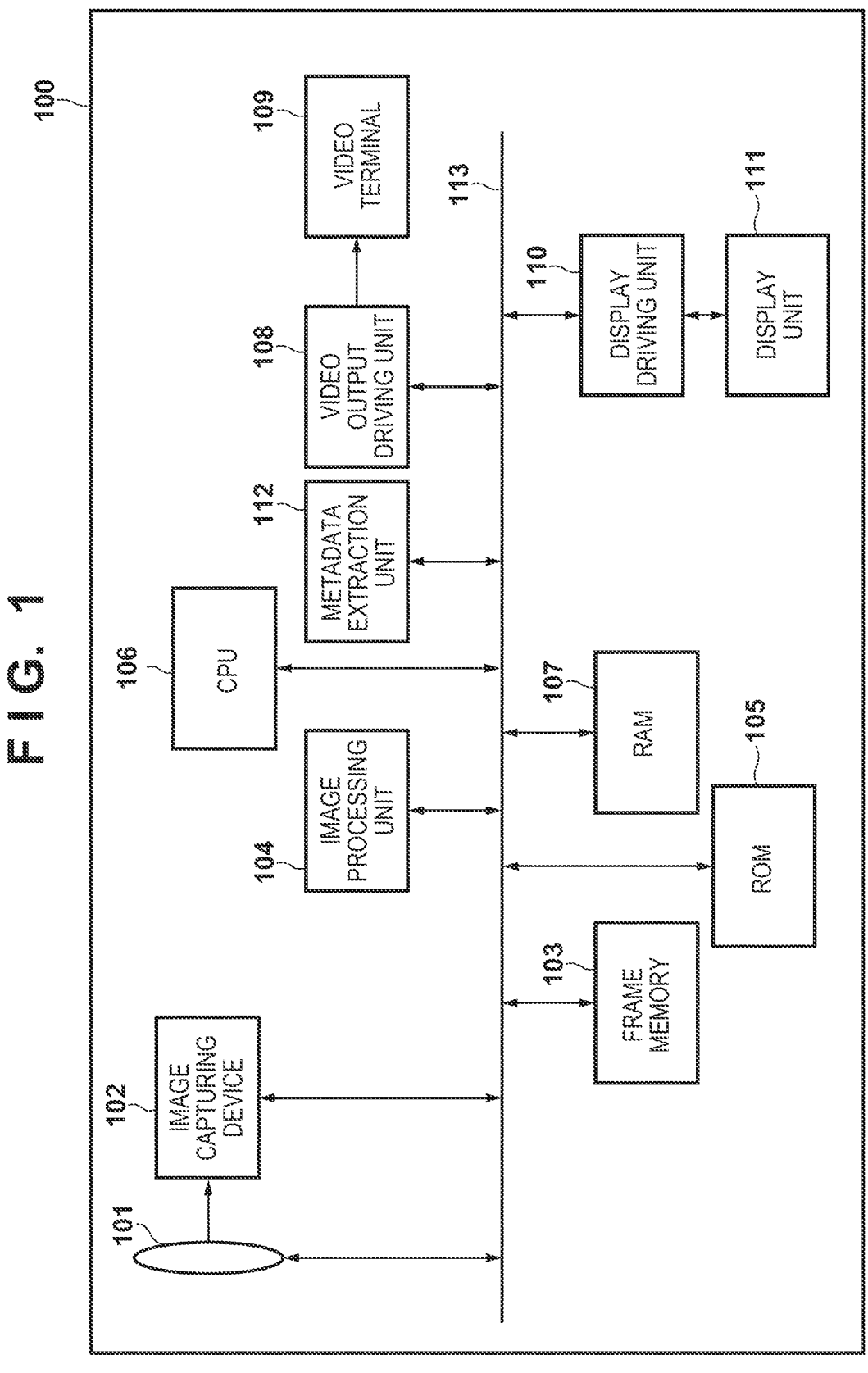

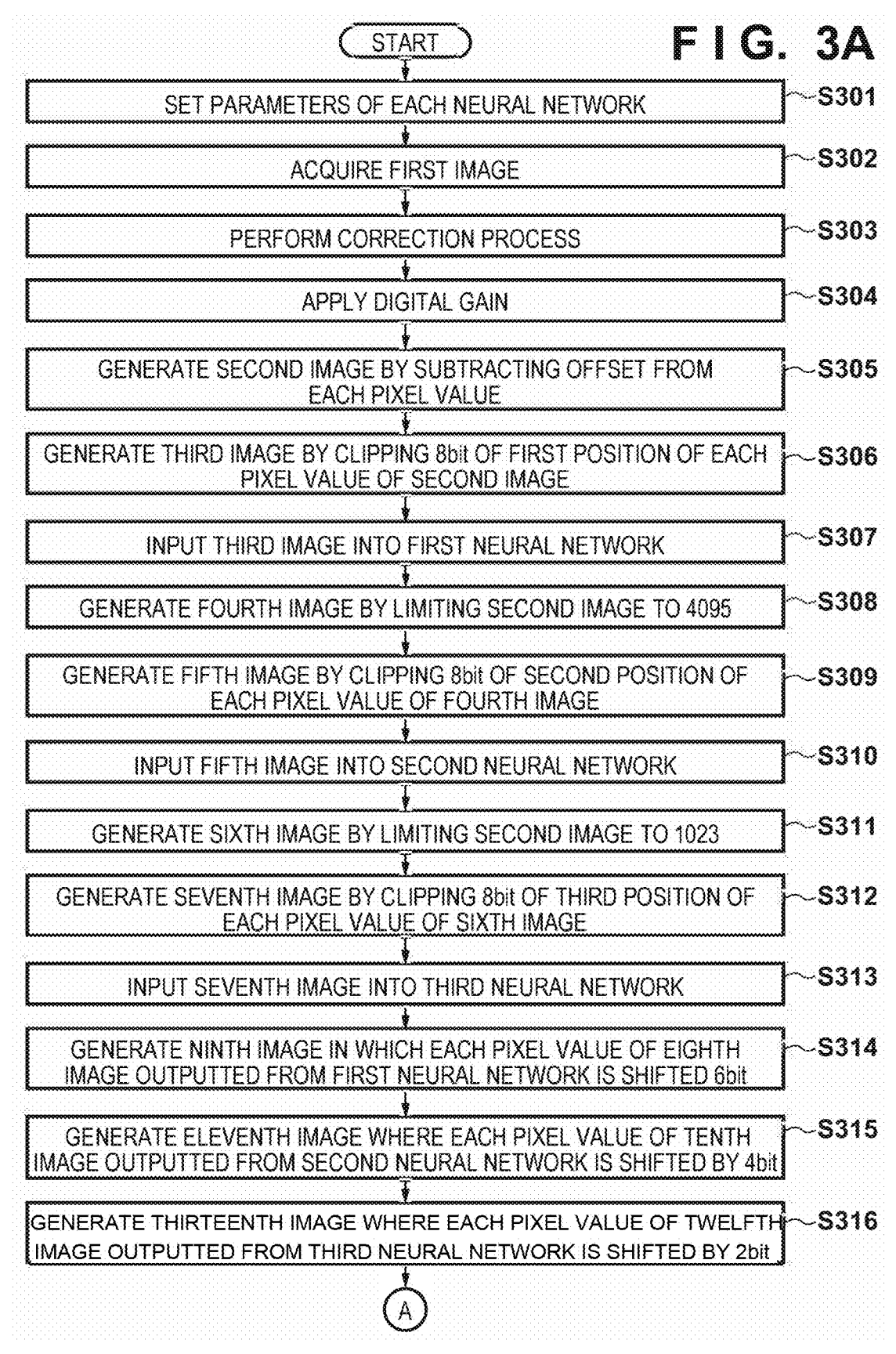

START

F I G. 3A

SET PARAMETERS OF EACH NEURAL NETWORK ~S301

ACQUIRE FIRST IMAGE ~S302

PERFORM CORRECTION PROCESS ~S303

APPLY DIGITAL GAIN ~S304

GENERATE SECOND IMAGE BY SUBTRACTING OFFSET FROM EACH PIXEL VALUE ~S305

GENERATE THIRD IMAGE BY CLIPPING 8bit OF FIRST POSITION OF EACH PIXEL VALUE OF SECOND IMAGE ~S306

INPUT THIRD IMAGE INTO FIRST NEURAL NETWORK ~S307

GENERATE FOURTH IMAGE BY LIMITING SECOND IMAGE TO 4095 ~S308

GENERATE FIFTH IMAGE BY CLIPPING 8bit OF SECOND POSITION OF EACH PIXEL VALUE OF FOURTH IMAGE ~S309

INPUT FIFTH IMAGE INTO SECOND NEURAL NETWORK ~S310

GENERATE SIXTH IMAGE BY LIMITING SECOND IMAGE TO 1023 ~S311

GENERATE SEVENTH IMAGE BY CLIPPING 8bit OF THIRD POSITION OF EACH PIXEL VALUE OF SIXTH IMAGE ~S312

INPUT SEVENTH IMAGE INTO THIRD NEURAL NETWORK ~S313

GENERATE NINTH IMAGE IN WHICH EACH PIXEL VALUE OF EIGHTH IMAGE OUTPUTTED FROM FIRST NEURAL NETWORK IS SHIFTED 6bit ~S314

GENERATE ELEVENTH IMAGE WHERE EACH PIXEL VALUE OF TENTH IMAGE OUTPUTTED FROM SECOND NEURAL NETWORK IS SHIFTED BY 4bit ~S315

GENERATE THIRTEENTH IMAGE WHERE EACH PIXEL VALUE OF TWELFTH IMAGE OUTPUTTED FROM THIRD NEURAL NETWORK IS SHIFTED BY 2bit ~S316

A

F I G.  3B

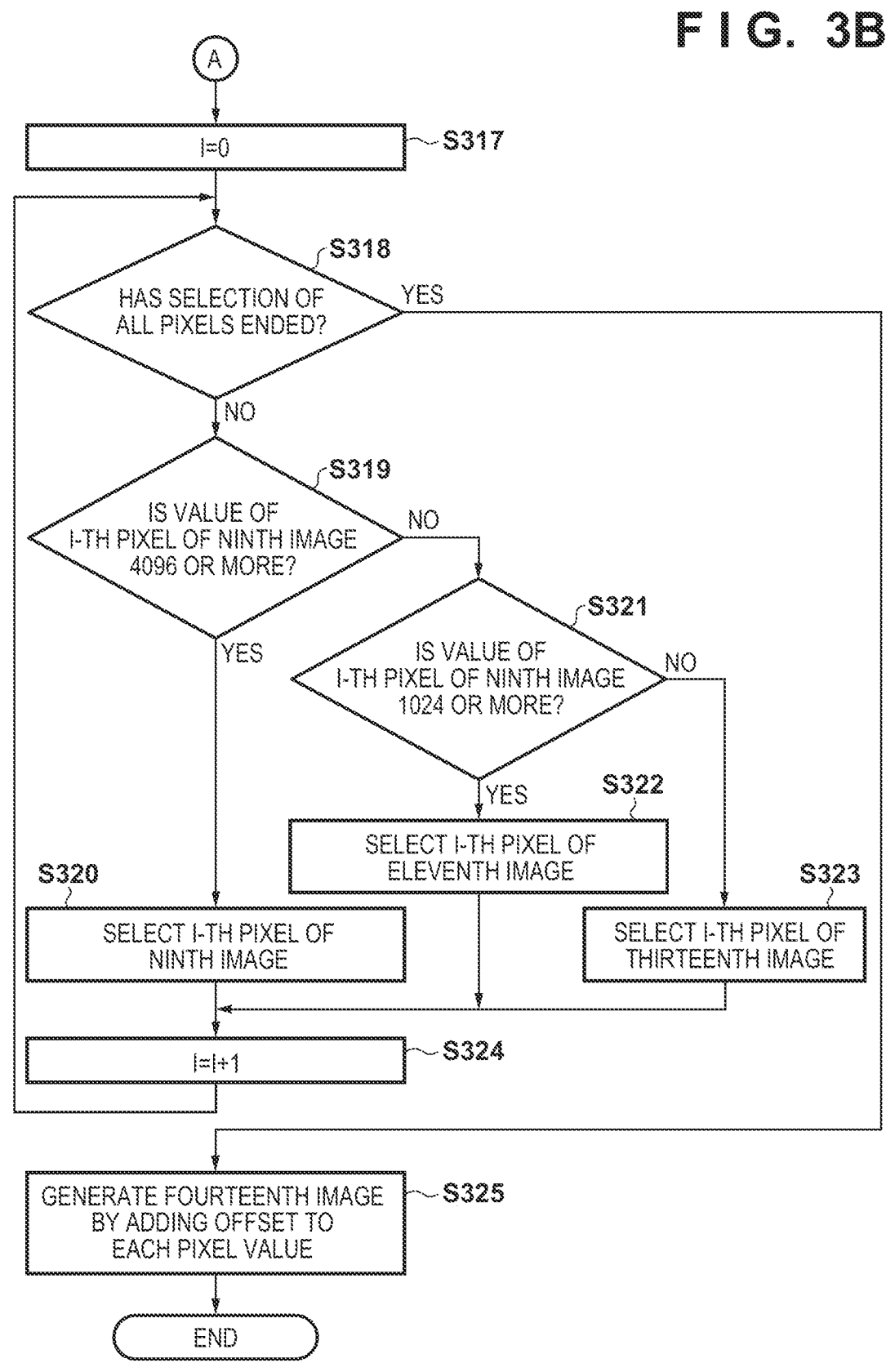

A

I=0 —— S317

S318
HAS SELECTION OF
ALL PIXELS ENDED? —— YES

NO

S319
IS VALUE OF
I-TH PIXEL OF NINTH IMAGE
4096 OR MORE? —— NO

YES

S321
IS VALUE OF
I-TH PIXEL OF NINTH IMAGE
1024 OR MORE? —— NO

YES

S322
SELECT I-TH PIXEL OF
ELEVENTH IMAGE

S320
SELECT I-TH PIXEL OF
NINTH IMAGE

S323
SELECT I-TH PIXEL OF
THIRTEENTH IMAGE

I=I+1 —— S324

GENERATE FOURTEENTH IMAGE
BY ADDING OFFSET TO
EACH PIXEL VALUE —— S325

END

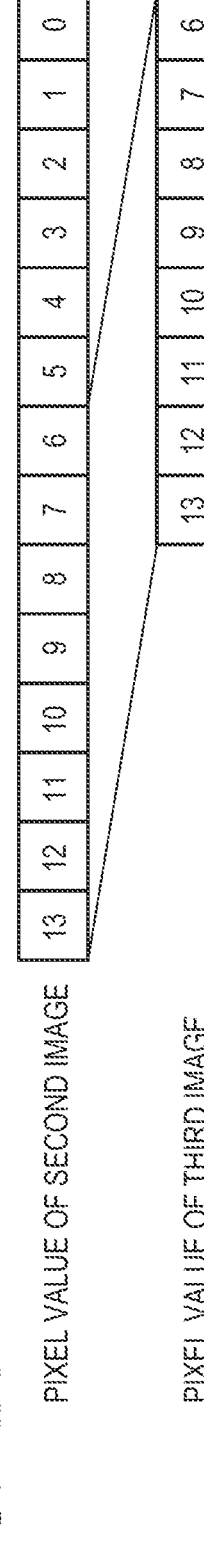
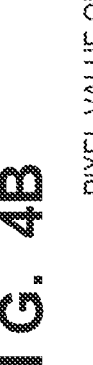
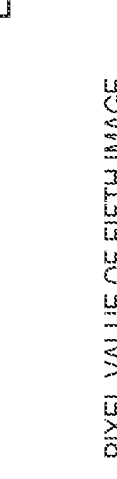
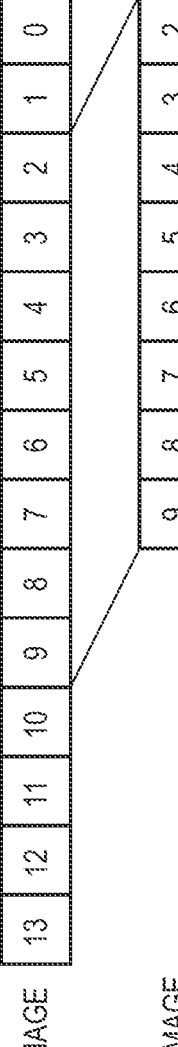
FIG. 4A
PIXEL VALUE OF SECOND IMAGE
PIXEL VALUE OF THIRD IMAGE
FIG. 4B
PIXEL VALUE OF SECOND IMAGE
PIXEL VALUE OF FIFTH IMAGE
FIG. 4C
PIXEL VALUE OF SECOND IMAGE
PIXEL VALUE OF SEVENTH IMAGE

PIXEL VALUE OF EIGHTH IMAGE

PIXEL VALUE OF NINTH IMAGE

PIXEL VALUE OF TENTH IMAGE

PIXEL VALUE OF ELEVENTH IMAGE

PIXEL VALUE OF TWELFTH IMAGE

PIXEL VALUE OF THIRTEENTH IMAGE

FIG. 7

F I G.  8A
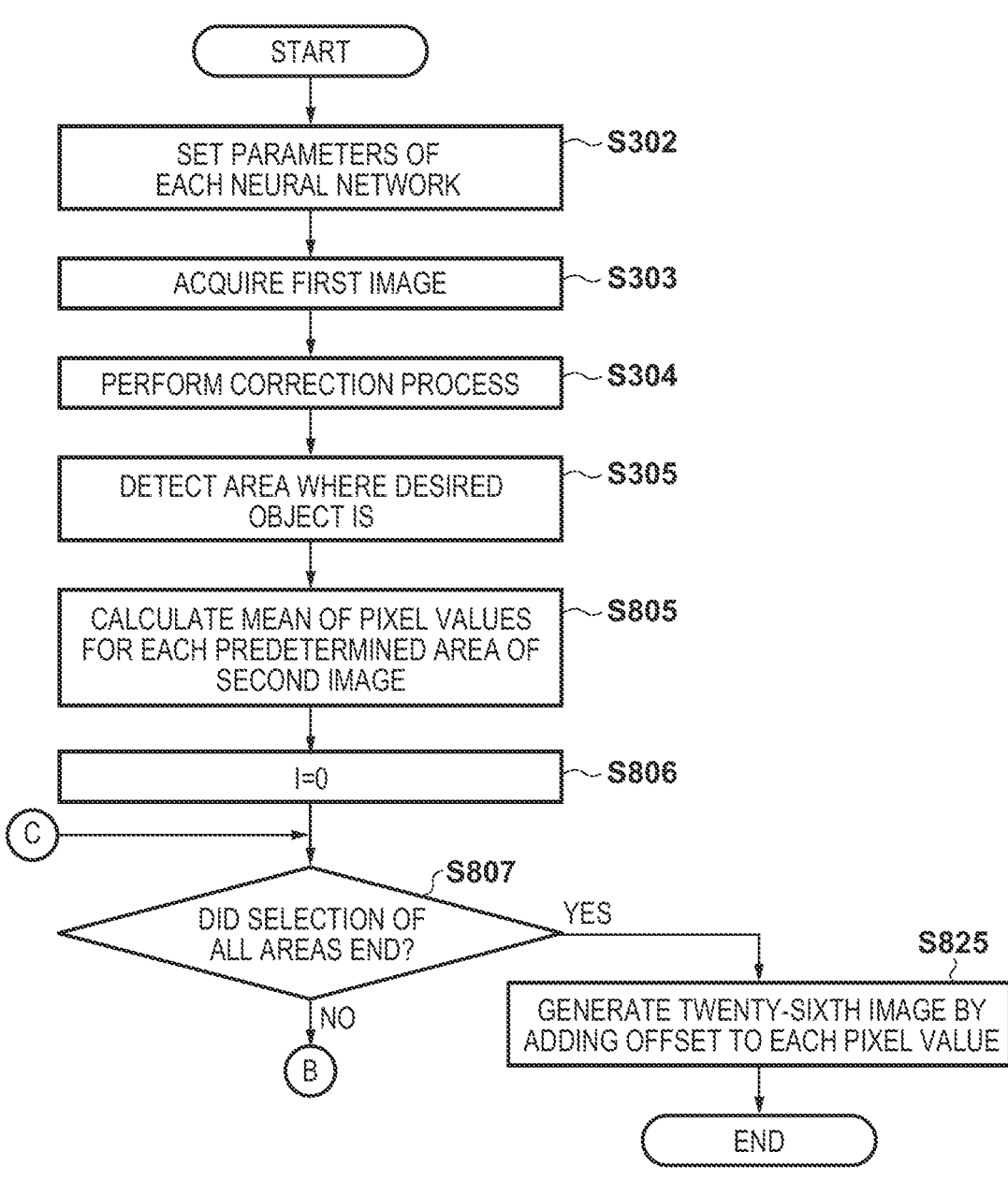

F I G. 8B
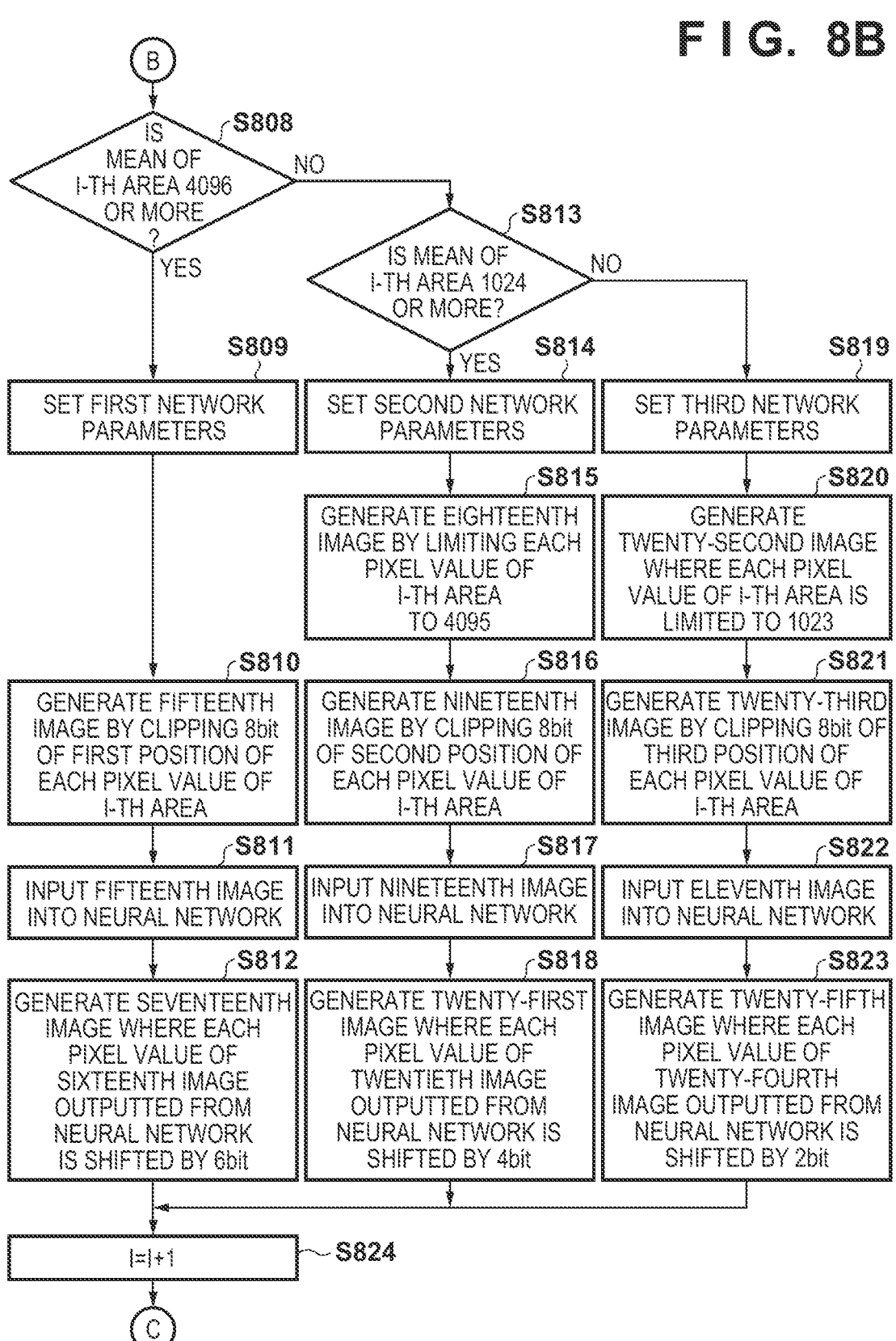

FIG. 9

| 1 | 2 | 3 |
|---|---|---|
| 4 | 5 | 6 |
| 7 | 8 | 9 |

F I G.  10A
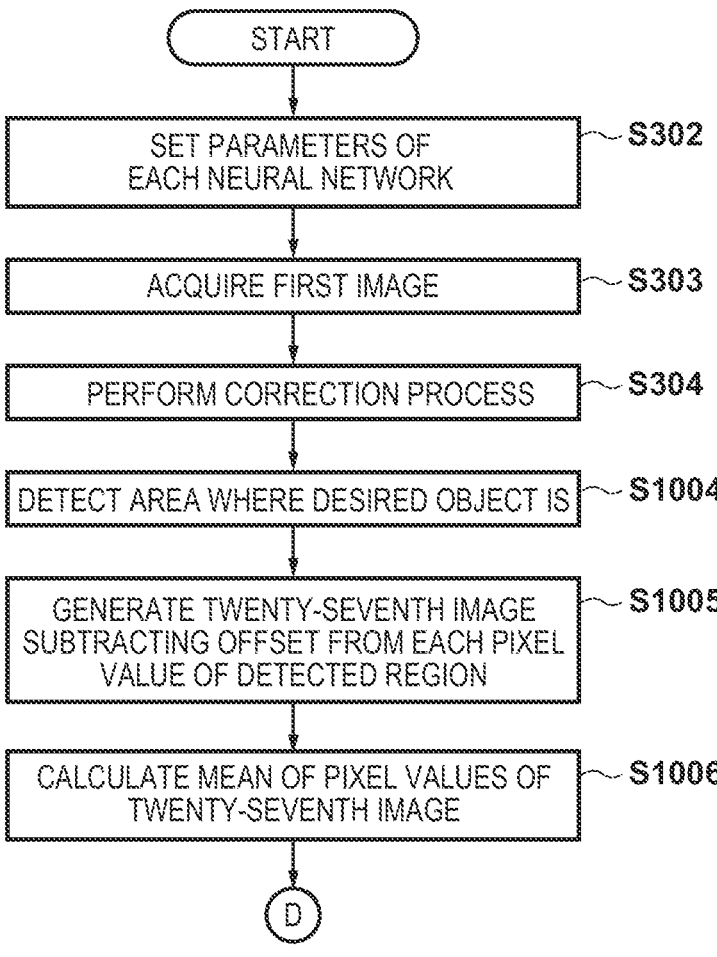

F I G. 10B
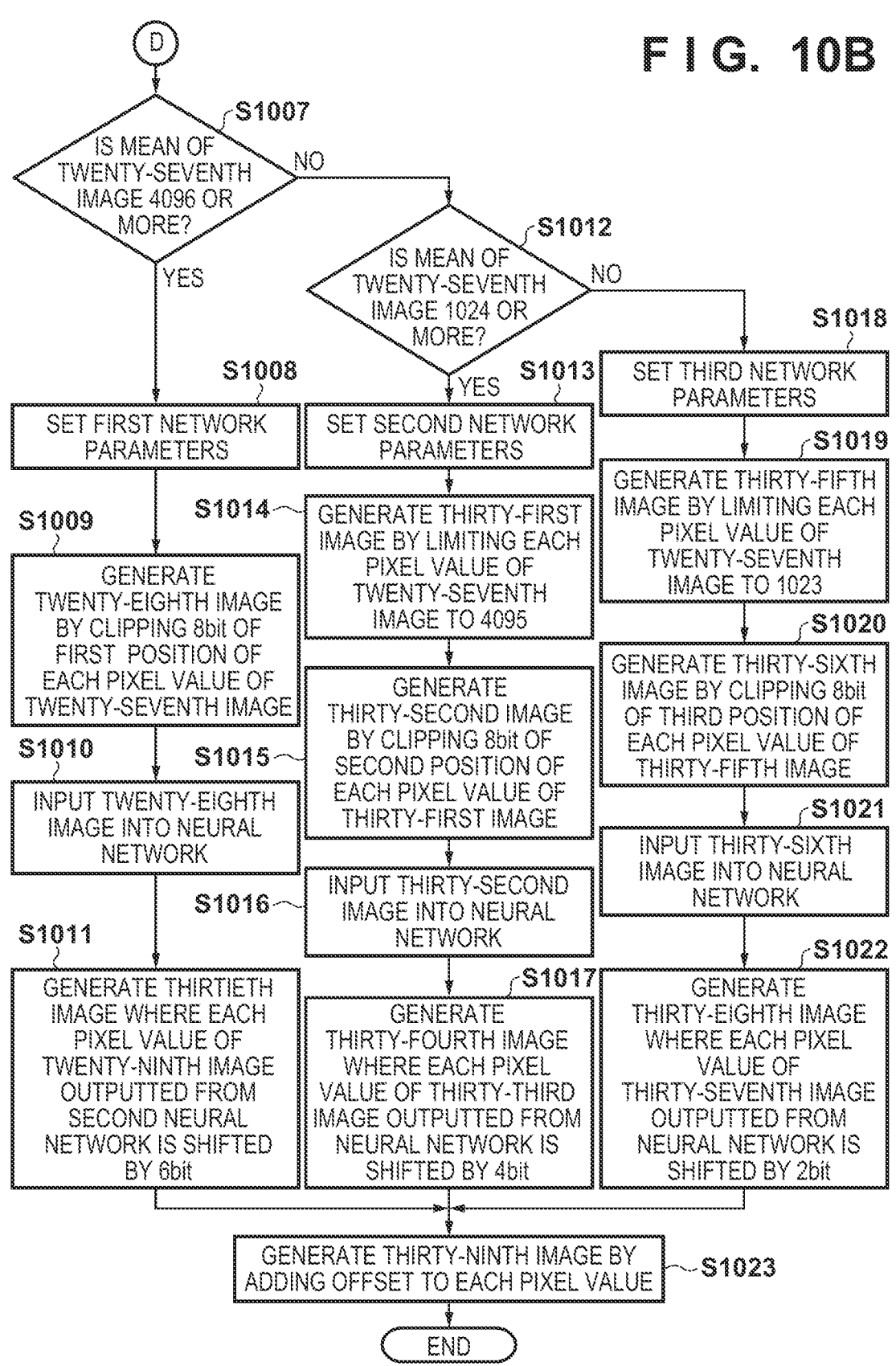

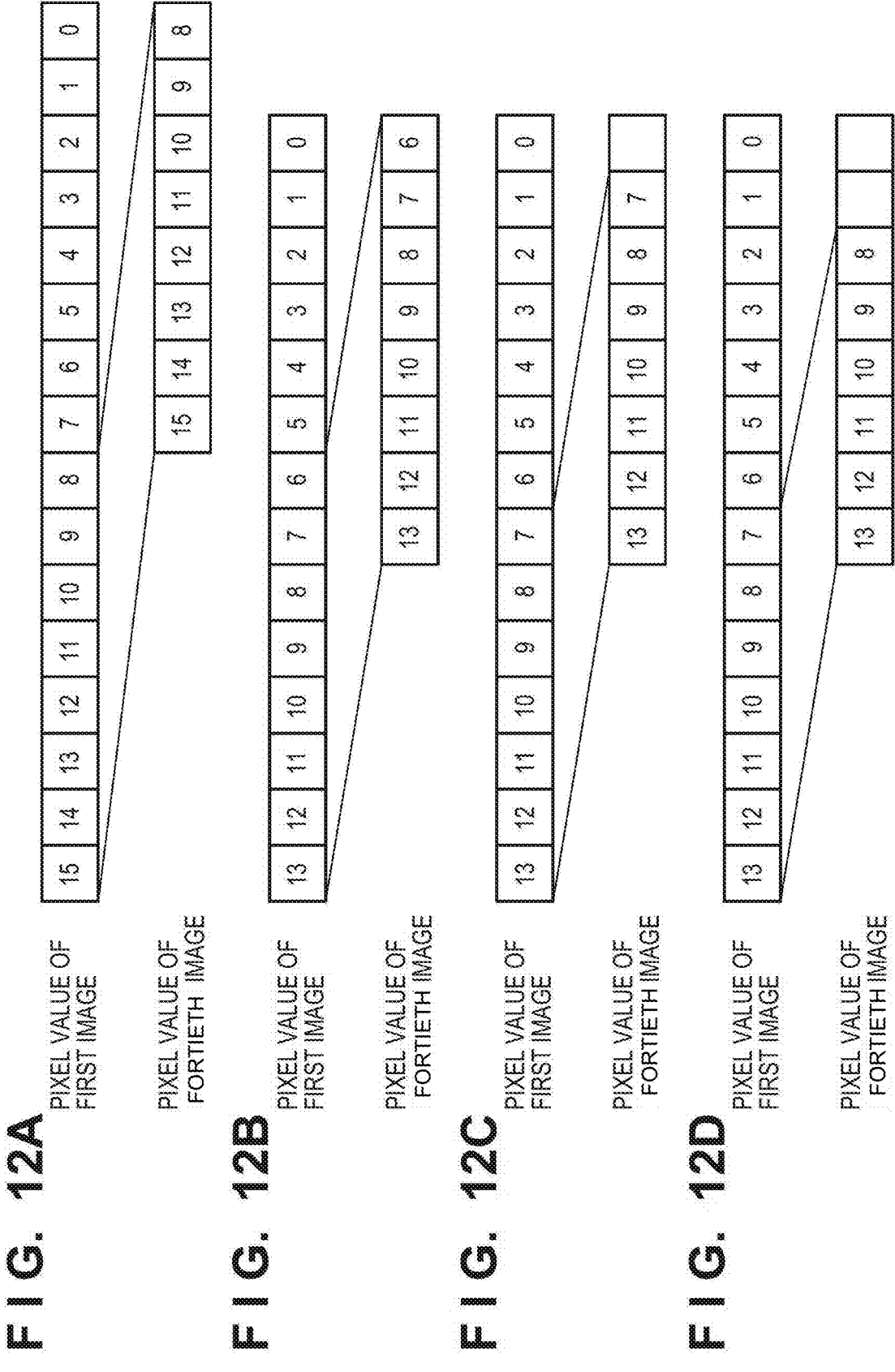
F I G. 12A
F I G. 12B
F I G. 12C
F I G. 12D

FIG. 13A
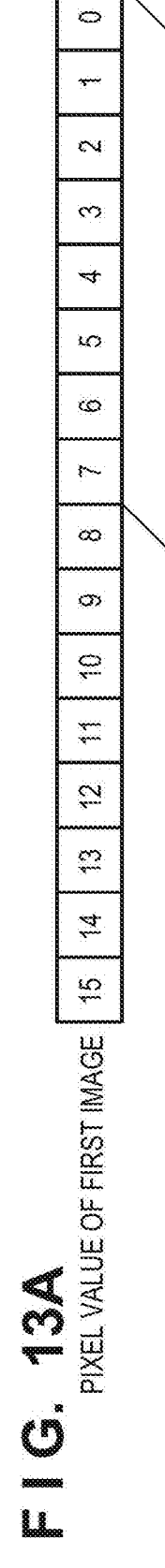
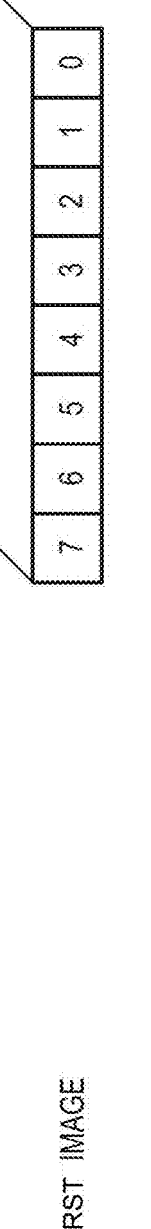
PIXEL VALUE OF FIRST IMAGE
PIXEL VALUE OF FORTY-FIRST IMAGE
FIG. 13B
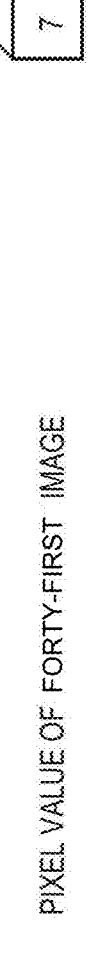
PIXEL VALUE OF FIRST IMAGE
PIXEL VALUE OF FORTY-FIRST IMAGE
FIG. 13C
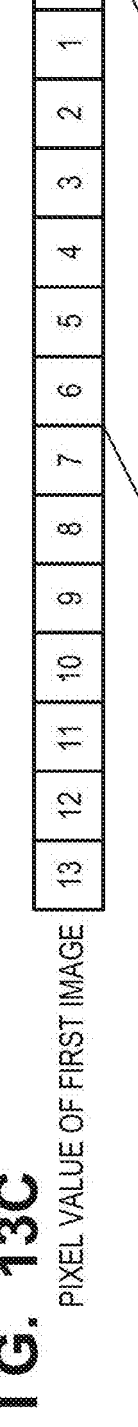
PIXEL VALUE OF FIRST IMAGE
PIXEL VALUE OF FORTY-FIRST IMAGE
FIG. 13D
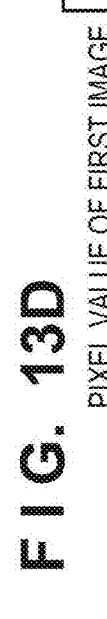
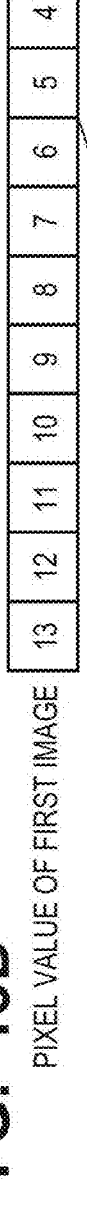
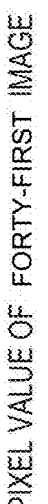
PIXEL VALUE OF FIRST IMAGE
PIXEL VALUE OF FORTY-FIRST IMAGE

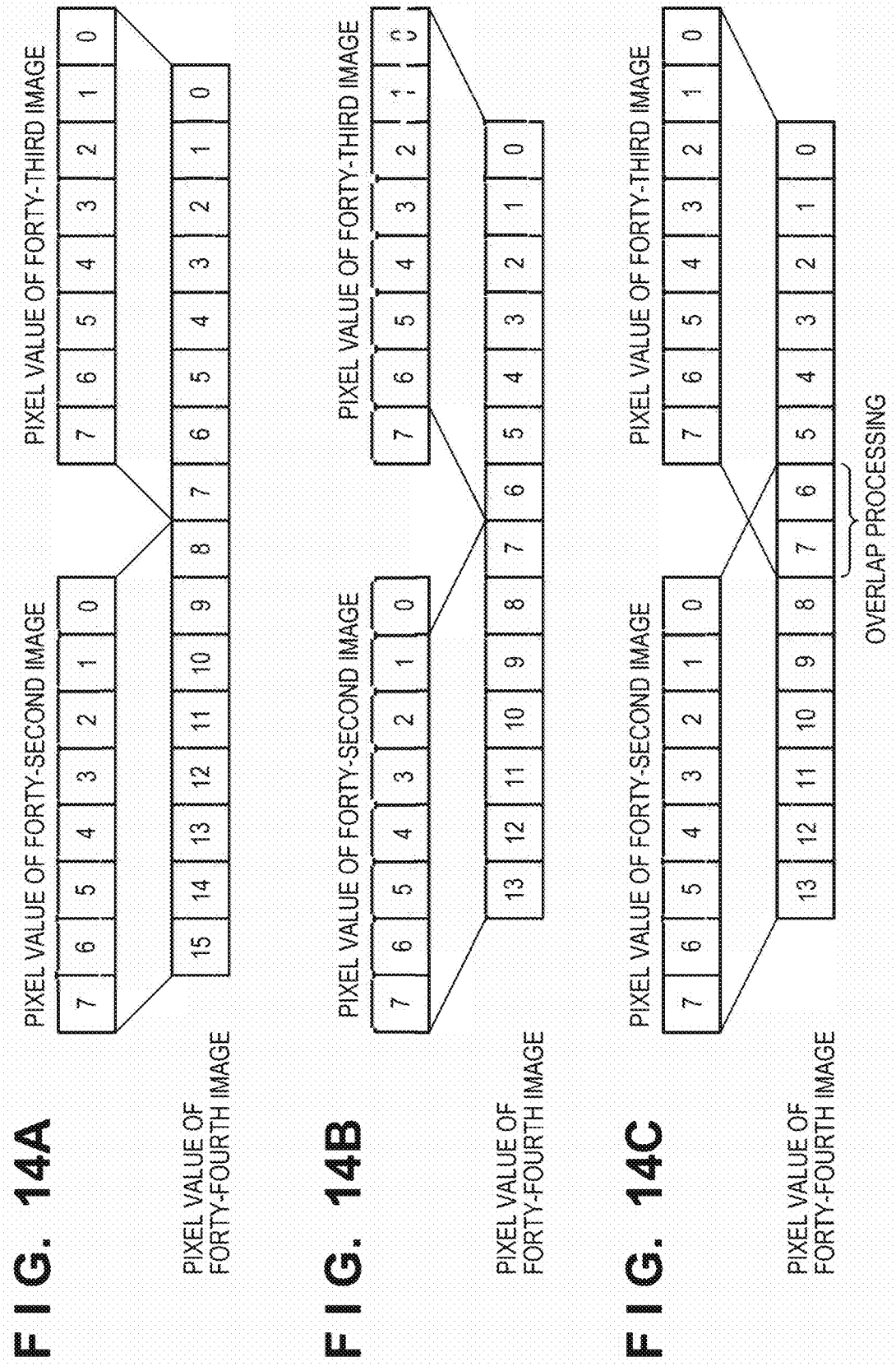
F I G. 14A
F I G. 14B
F I G. 14C

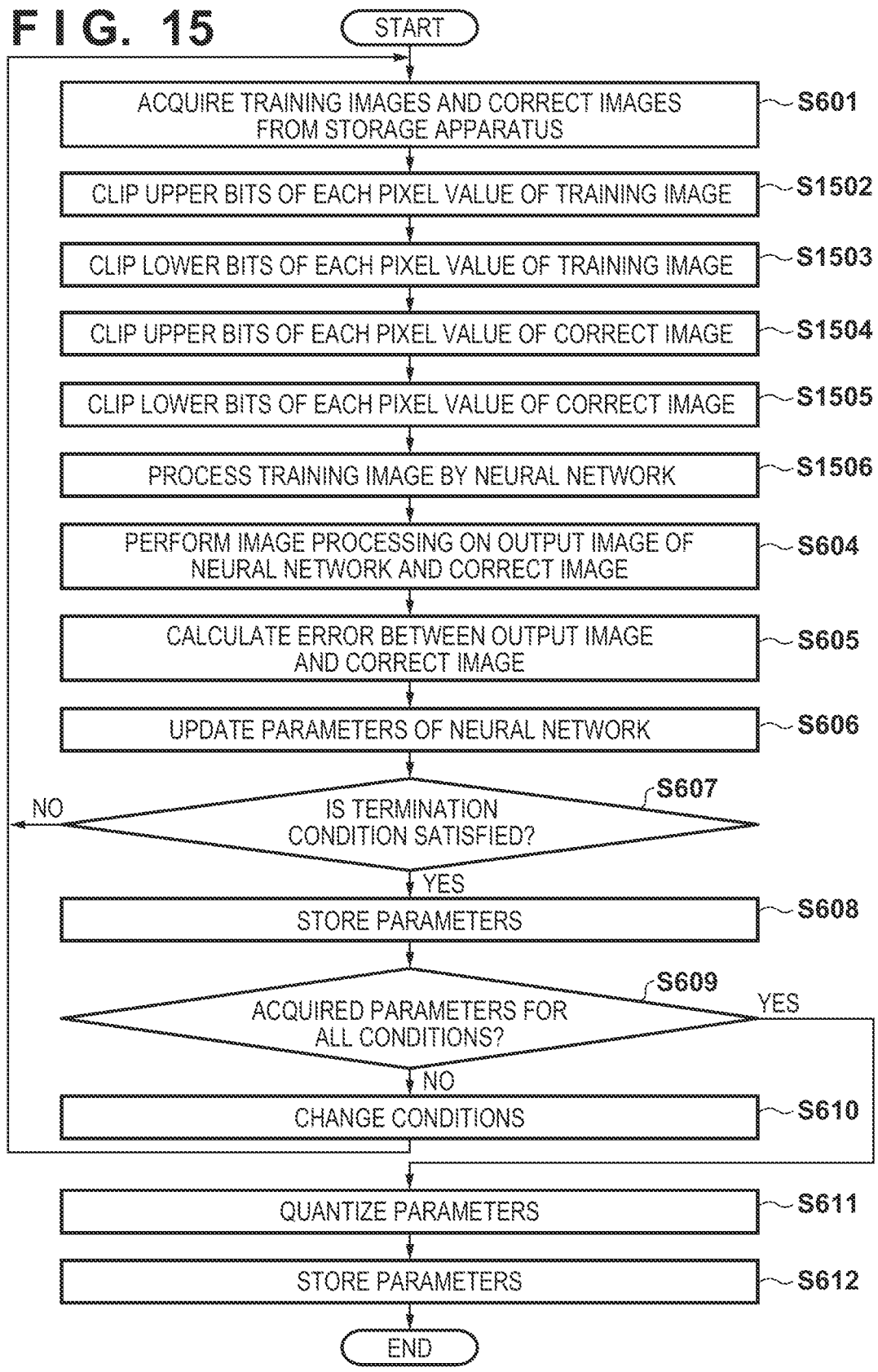
F I G. 15

F I G. 16

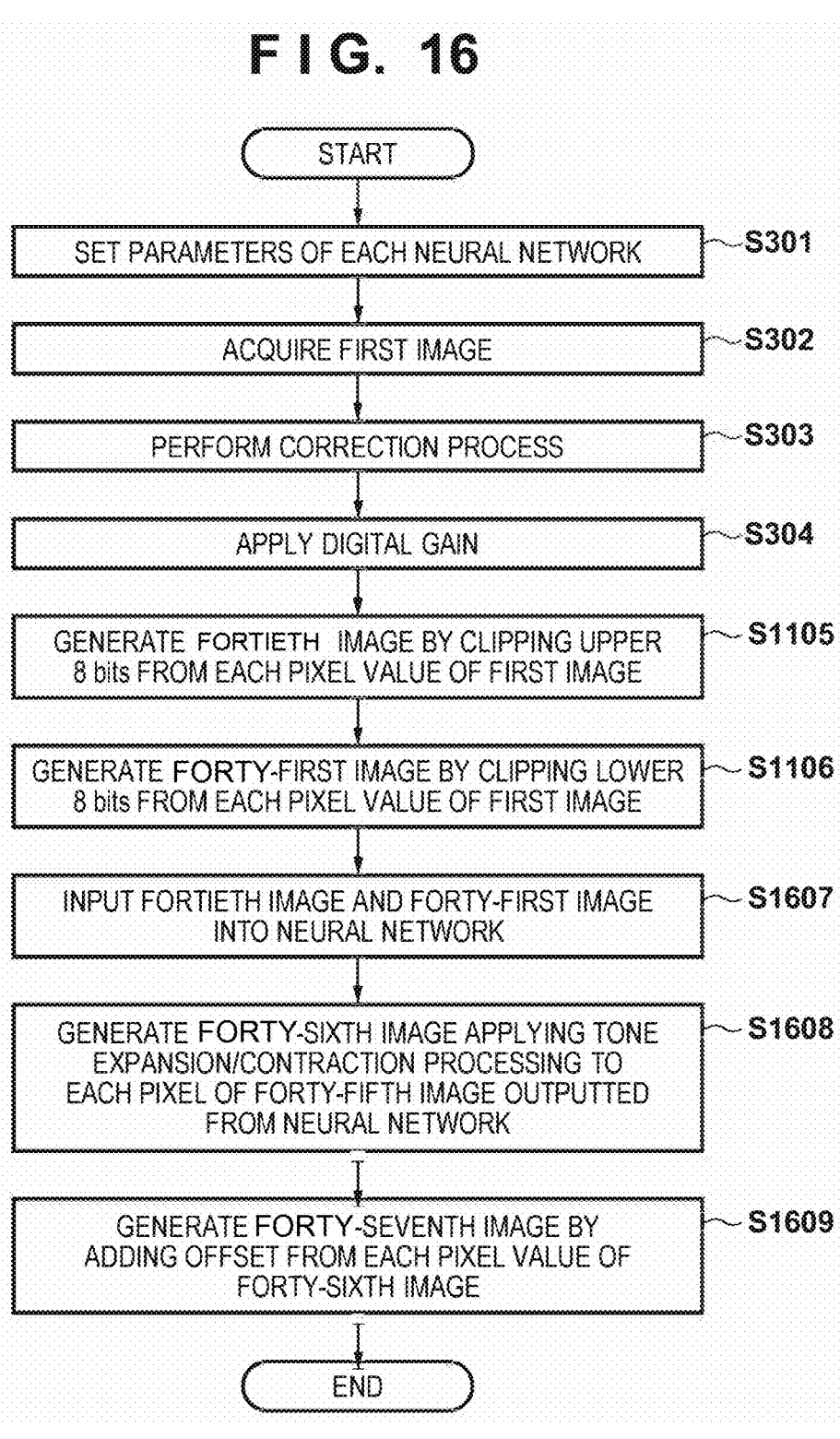

START

SET PARAMETERS OF EACH NEURAL NETWORK — S301

ACQUIRE FIRST IMAGE — S302

PERFORM CORRECTION PROCESS — S303

APPLY DIGITAL GAIN — S304

GENERATE FORTIETH IMAGE BY CLIPPING UPPER 8 bits FROM EACH PIXEL VALUE OF FIRST IMAGE — S1105

GENERATE FORTY-FIRST IMAGE BY CLIPPING LOWER 8 bits FROM EACH PIXEL VALUE OF FIRST IMAGE — S1106

INPUT FORTIETH IMAGE AND FORTY-FIRST IMAGE INTO NEURAL NETWORK — S1607

GENERATE FORTY-SIXTH IMAGE APPLYING TONE EXPANSION/CONTRACTION PROCESSING TO EACH PIXEL OF FORTY-FIFTH IMAGE OUTPUTTED FROM NEURAL NETWORK — S1608

GENERATE FORTY-SEVENTH IMAGE BY ADDING OFFSET FROM EACH PIXEL VALUE OF FORTY-SIXTH IMAGE — S1609

END

FIG. 17

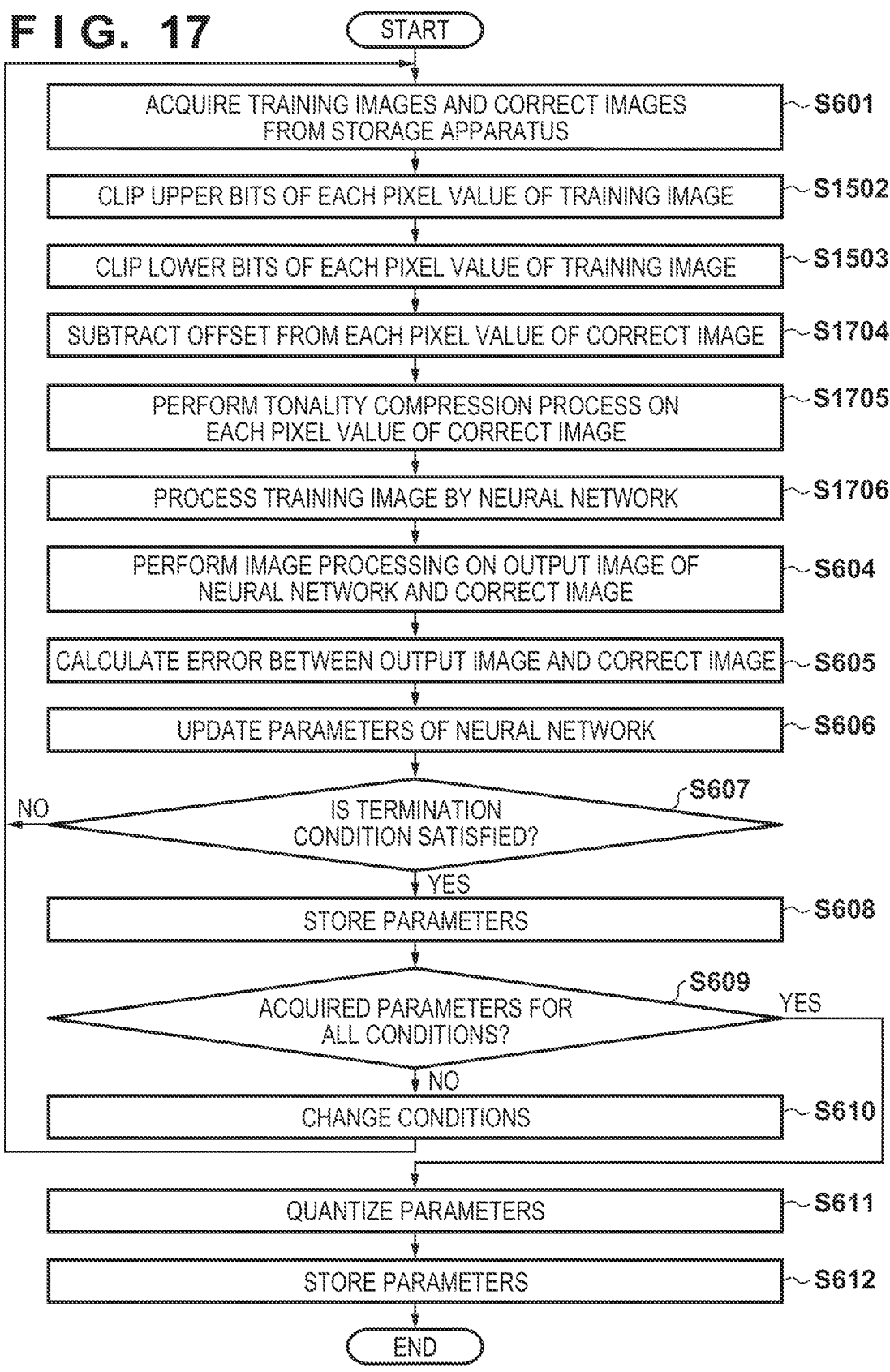

START

ACQUIRE TRAINING IMAGES AND CORRECT IMAGES FROM STORAGE APPARATUS ~S601

CLIP UPPER BITS OF EACH PIXEL VALUE OF TRAINING IMAGE ~S1502

CLIP LOWER BITS OF EACH PIXEL VALUE OF TRAINING IMAGE ~S1503

SUBTRACT OFFSET FROM EACH PIXEL VALUE OF CORRECT IMAGE ~S1704

PERFORM TONALITY COMPRESSION PROCESS ON EACH PIXEL VALUE OF CORRECT IMAGE ~S1705

PROCESS TRAINING IMAGE BY NEURAL NETWORK ~S1706

PERFORM IMAGE PROCESSING ON OUTPUT IMAGE OF NEURAL NETWORK AND CORRECT IMAGE ~S604

CALCULATE ERROR BETWEEN OUTPUT IMAGE AND CORRECT IMAGE ~S605

UPDATE PARAMETERS OF NEURAL NETWORK ~S606

IS TERMINATION CONDITION SATISFIED? S607
NO
YES

STORE PARAMETERS ~S608

ACQUIRED PARAMETERS FOR ALL CONDITIONS? S609 YES
NO

CHANGE CONDITIONS ~S610

QUANTIZE PARAMETERS ~S611

STORE PARAMETERS ~S612

END

F I G. 18

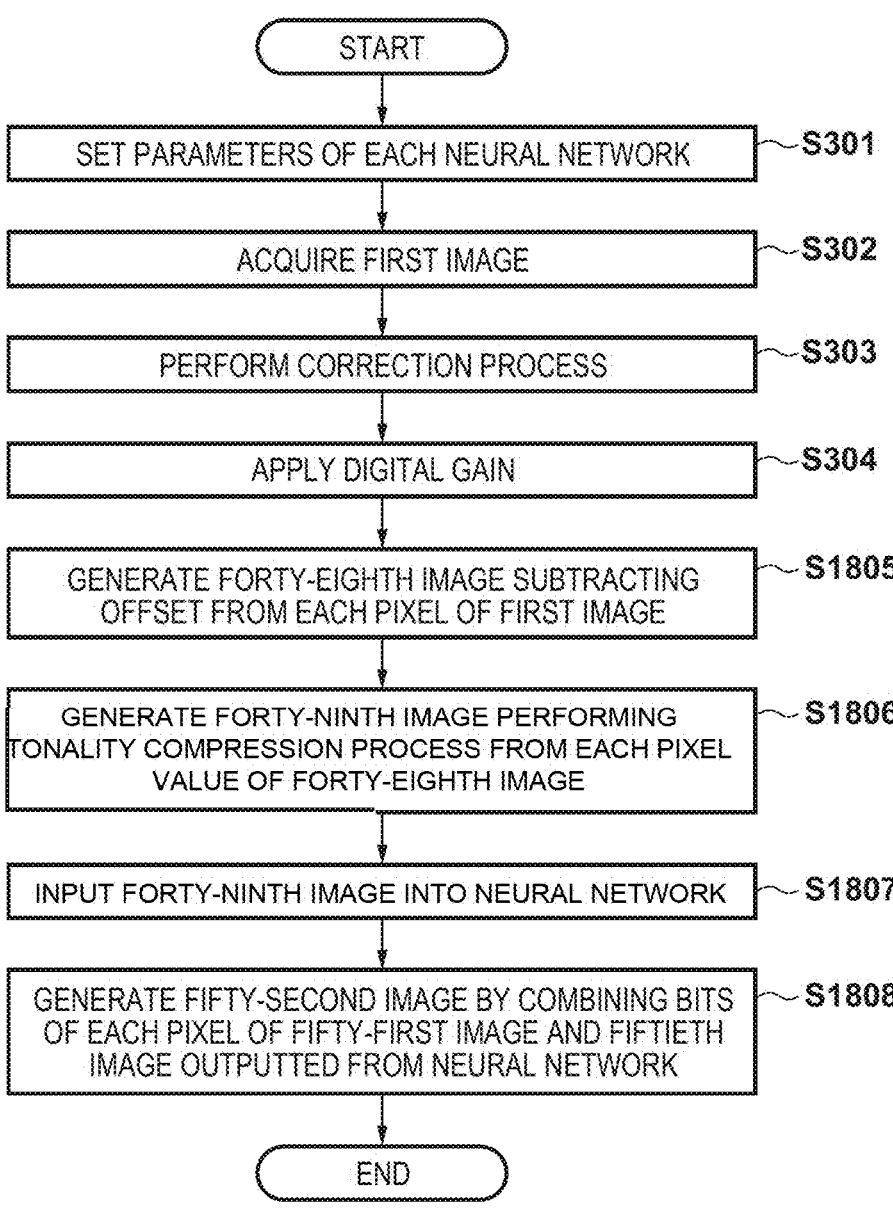

START

SET PARAMETERS OF EACH NEURAL NETWORK ~S301

ACQUIRE FIRST IMAGE ~S302

PERFORM CORRECTION PROCESS ~S303

APPLY DIGITAL GAIN ~S304

GENERATE FORTY-EIGHTH IMAGE SUBTRACTING OFFSET FROM EACH PIXEL OF FIRST IMAGE ~S1805

GENERATE FORTY-NINTH IMAGE PERFORMING TONALITY COMPRESSION PROCESS FROM EACH PIXEL VALUE OF FORTY-EIGHTH IMAGE ~S1806

INPUT FORTY-NINTH IMAGE INTO NEURAL NETWORK ~S1807

GENERATE FIFTY-SECOND IMAGE BY COMBINING BITS OF EACH PIXEL OF FIFTY-FIRST IMAGE AND FIFTIETH IMAGE OUTPUTTED FROM NEURAL NETWORK ~S1808

END

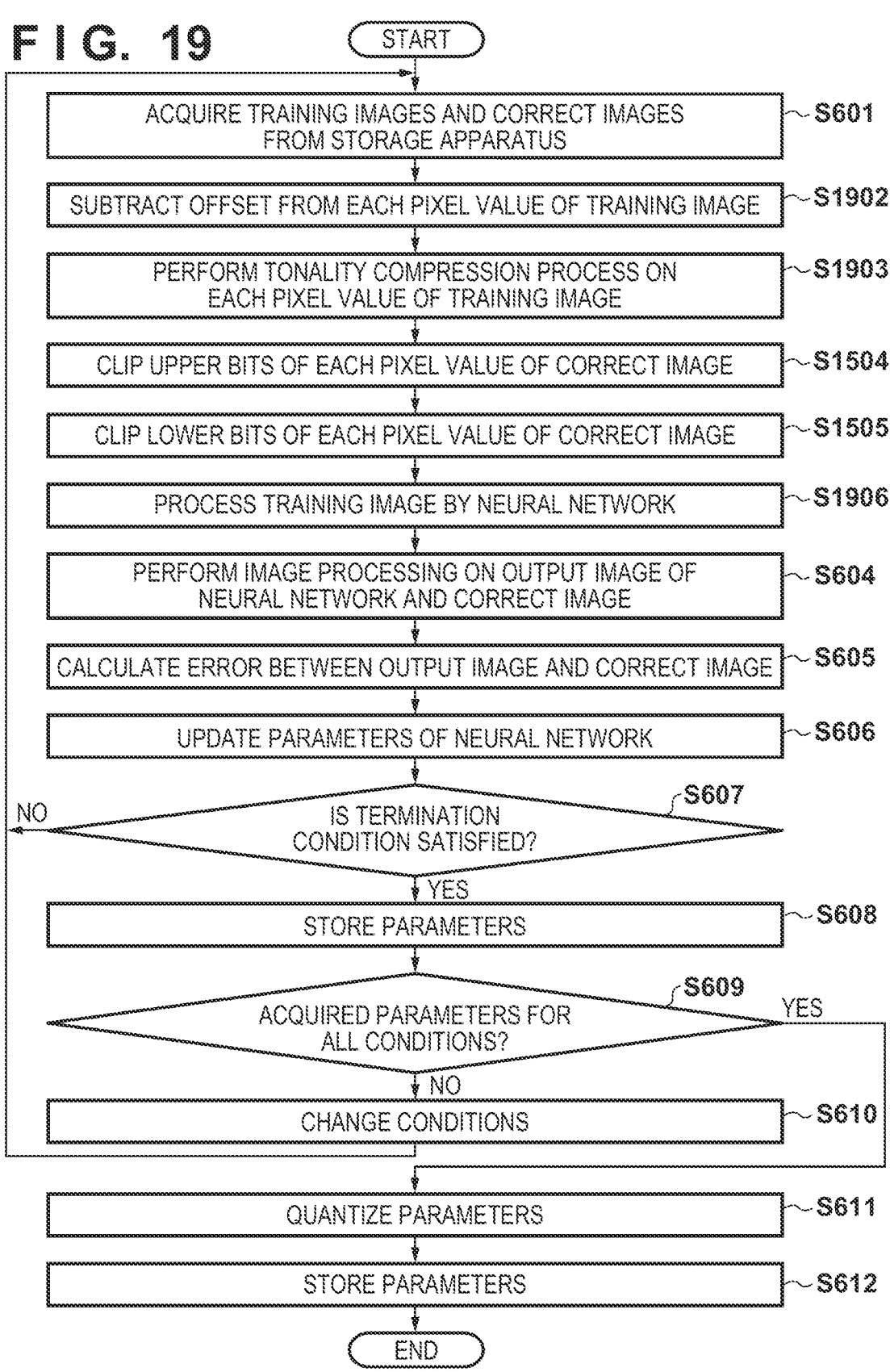
F I G. 19

GENERATION OF PLURAL IMAGES HAVING M-BIT DEPTH PER PIXEL BY CLIPPING M-BIT SEGMENTS FROM MUTUALLY DIFFERENT POSITIONS IN IMAGE HAVING N-BIT DEPTH PER PIXEL

CROSS-REFERENCE TO PRIORITY APPLICATION

This application claims the benefit of Japanese Patent Application No. 2021-195650, filed Dec. 1, 2021, which is hereby incorporated by reference herein in its entirety.

BACKGROUND OF THE INVENTION

Field of the Invention

The invention relates to an image processing apparatus, a control method thereof, and a non-transitory computer-readable storage medium.

Description of the Related Art

In recent years, there are proposed a large number of image processing methods using deep learning. An arithmetic operation of a convolutional neural network (CNN) generally used in inference of deep learning is substantially time consuming. Accordingly, there is also proposed a scheme in which a precision of an arithmetic operation of the CNN is set to be INT8 (8-bit precision).

Images captured by a camera or the like may include noise generated depending on camera settings and status at the time of capturing. It is proposed to use the aforementioned deep learning technique in order to eliminate such noise.

Japanese Patent Laid-Open No. 2019-121252 (Literature 1, in the following) discloses an inference method for images with improved resolution or contrast when eliminating noise using a neural network. According to Literature 1, it is possible to improve the inference precision by performing gamma correction adjusted to the output format to be viewed by the user, when inputting a RAW image in the neural network for learning.

Japanese Patent Laid-Open No. 2018-077786 (Literature 2, in the following) performs area division for each noise level by subjecting the image to deep learning for area estimation, before eliminating noise using deep learning. It is thus possible to improve the precision of noise elimination by converting each area into values in consideration of pixel values and noise, and subsequently subjecting the converted values to deep learning that performs noise elimination.

However, both Literatures 1 and 2 do not consider performing the CNN with a precision of an arithmetic operation of INT8. Sensors used in cameras have a higher bit precision than 8 bits, and thus there has been a problem in using the CNN with INT8 that tone may be lost due to reduction of the number of bits.

SUMMARY OF THE INVENTION

The present invention intends to provide a technique for suppressing reduction of tone of images having an N-bit depth deeper than M bits, while using a system that employs a CNN with M-bit precision.

According to an aspect of the invention, there is provided an image processing apparatus comprising: a first generation unit configured to generate a plurality of images having an M-bit depth per pixel by inputting an input image having a bit depth of N bits, and clipping M-bit segments from mutually different positions within the N bits; a second generation unit including a neural network for an M-bit-depth image and configured to generate, by inputting the plurality of images generated by the first generation unit into the neural network, a plurality of output images corresponding to each of the plurality of images being input; and a third generation unit configured to generate an image having the N-bit depth from the plurality of output images generated by the second generation unit.

According to the present invention, it is possible to perform a process with suppressed reduction of tone of images having an N-bit depth deeper than M bits, while using a system that employs a CNN with an M-bit precision.

Further features of the present invention will become apparent from the following description of exemplary embodiments with reference to the attached drawings.

BRIEF DESCRIPTION OF THE DRAWINGS

FIG. 1 is a basic system block diagram for performing an inference, which is common to all embodiments;

FIGS. 3A and 3B are flowcharts of an inference process, according to a first embodiment;

FIGS. 4A to 4C are schematic diagrams of 8-bit clipping which is common to all embodiments;

FIG. 7 is a schematic diagram of a neural network, which is common to all embodiments;

FIGS. 8A and 8B are flowcharts of an inference process, according to a second embodiment;

FIG. 9 is a schematic diagram of area division according to a second embodiment;

FIGS. 10A and 10B are flowcharts of an inference process according to a third embodiment;

FIGS. 12A to 12D are schematic diagrams of upper bit clipping, which is common to the fourth to a sixth embodiments;

FIGS. 13A to 13D are schematic diagrams of lower bit clipping, which is common to the fourth to the sixth embodiments;

FIGS. 14A to 14C are schematic diagrams of bit concatenation common to the fourth to sixth embodiments;

FIG. 15 is a flowchart of a learning process according to the fourth embodiment;

FIG. 16 is a flowchart of an inference process of a fifth embodiment;

FIG. 17 is a flowchart of a learning process according to the fifth embodiment;

FIG. 18 is a flowchart of an inference process according to the sixth embodiment; and FIG. 19 is a flowchart of a learning process according to the sixth embodiment.

DESCRIPTION OF THE EMBODIMENTS

Figure 2:
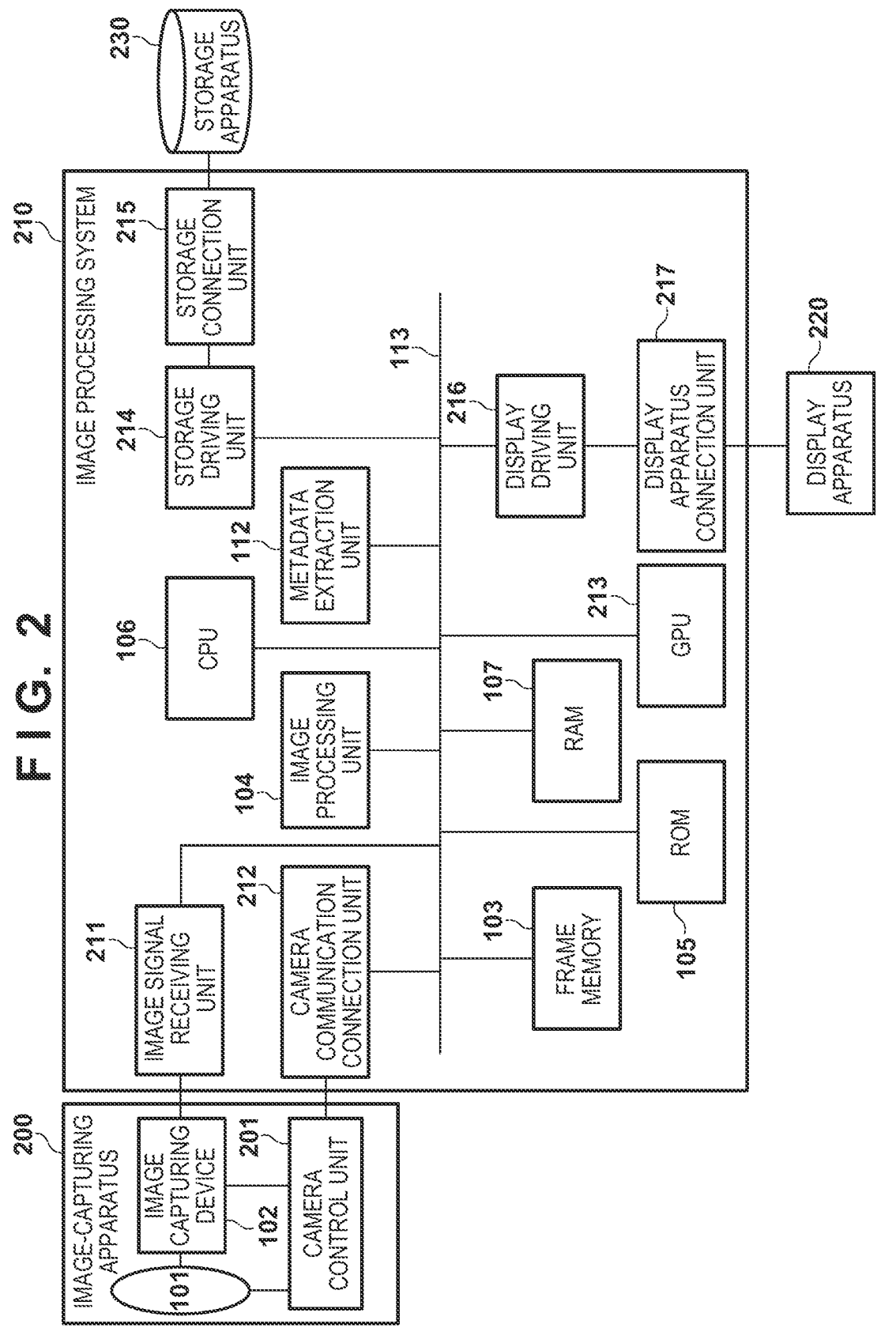
FIG. 2 is a basic system block diagram for performing learning, which is common to all embodiments.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First, there will be described an image processing apparatus configured to perform inference according to the present embodiment. FIG. 1 is a configuration diagram of an image processing apparatus 100. In FIG. 1, a CPU 106, a ROM 105, a RAM 107, an image processing unit 104, an optical lens 101, an image capturing device 102, a frame memory 103, a video output driving unit 108, a display driving unit 110, and a metadata extraction unit 112 are connected to an internal bus 113. Each of the units can exchange data with each other via the internal bus 113.

The optical lens 101 is an optical device including a lens and a motor configured to drive the lens. The optical lens 101, which operates based on a control signal, can optically enlarge or shrink video, or adjust the focal distance. In addition, when there is a desire to adjust the amount of incident light, the amount of light can be adjusted to a desired luminance by controlling the opening area (F value) of the aperture. The light transmitted through the lens forms an image on the detection surface of the image capturing device 102. The image capturing device 102, for which a CCD sensor or a CMOS sensor is used, serves to convert an optical image formed on the detection surface thereof into an electrical signal. The image capturing device 102, which is driven based on a control signal, resets the charge in a pixel or controls the read timing. In addition, the image capturing device 102 also has a function of performing gain processing on a pixel signal read out as an electrical analog signal (voltage value), or converting an analog signal into a digital signal.

The image processing unit 104 performs various image processing on images input from the image capturing device 102. The processing includes, for example, correction of the amount of light generated in the periphery of the image due to characteristics of the optical lens 101, correction of sensitivity variation for each pixel of the image capturing device 102, correction with respect to color, flicker correction, or the like. The image processing unit 104 also has a function of performing noise reduction process using neural network parameters, details of which will be described below.

The frame memory 103, which is generally referred to as Random Access Memory (RAM), is a device that temporarily stores video signals which can be read when necessary. Since video signals have an enormous amount of data, the frame memory 103 is required to be of a high speed and a large capacity. In recent years, Dual Data Rate 4-Synchronous Dynamic RAM (DDR4-SDRAM), or the like, are often used. Using the frame memory 103 allows for various processing. For example, the frame memory 103 is an indispensable device for image processing, such as synthesizing temporally different images or clipping only a required area.

A Central Processing Unit (CPU) 106 is provided as a control unit configured to control each function of the image Processing apparatus 100. The CPU 106 functions as the brain of the present device. The CPU 106 has the Read Only Memory (ROM) 105 and the RAM 107 connected thereto. The ROM 105, which is a non-volatile memory device, has stored therein programs for operating the CPU 106, as well as various adjustment parameters or the like. A program read from the ROM 105 is deployed in the volatile RAM 107 and executed by the CPU 106. Generally, the RAM 107 being employed is lower in speed and smaller in capacity than those of the frame memory 103.

The metadata extraction unit 112 extracts metadata information such as a lens drive condition and a sensor drive condition. The image generated by the image processing unit 104 is output to the outside of the image processing apparatus 100 via the video output driving unit 108 and the video terminal 109. There are a variety of representative interfaces such as Serial Digital Interface (SDI), High Definition Multimedia Interface (HDMI) (trade name), or DisplayPort (trade name), which allow for displaying real-time video on an external monitor or the like.

In addition, the image generated by the image processing unit 104 is displayed on a display unit 111 via the display driving unit 110. The display unit 111, which is a display device visible by the user, can display, for example, setting menus or video that have been processed by the image processing unit 104, and allows for checking the operation status of the image processing apparatus 100. The display unit 111 employs, a compact and low power consumption device such as, for example, a Liquid Crystal Display (LCD) or an organic Electro luminescence (EL). Furthermore, a resistive film type or a capacitance type thin film device called a touch panel may also be provided together. The CPU 106 generates a character string for notifying the user of the setting state of the image processing apparatus 100, or a menu for setting the image processing apparatus 100, and displays the character string or the menu on the display unit 111 in a superimposed manner on the video processed by the image processing unit 104. In addition to character information, it is also possible to superimpose shooting assist display such as histogram, vector scope, waveform monitor, zebra, peaking, false color, or the like.

Next, there will be described a system configured to perform learning, according to the present embodiment. FIG. 2 is a system including an image capturing apparatus 200, an image processing system 210, a display apparatus 220, and a storage apparatus 230.

A camera control unit 201 controls driving of the optical lens 101 and the image capturing device 102, based on an instruction signal (command) received from a camera communication connection unit 212. An image signal receiving unit 211 receives an image signal (image data) from the image capturing apparatus 200.

A GPU 213 performs various arithmetic operations under control by the CPU 106. The GPU 213 in the embodiment is used at least in performing learning based on deep learning. In particular, an enormous amount of calculation is required for learning, and therefore a GPU having a higher image processing capability than a CPU is used. In addition, the GPU 213 may be used for generating an image to be displayed on the display apparatus 220. On this occasion, the image generated by control from the GPU 213 is displayed on the display apparatus 220 via a display driving unit 216 and a display apparatus connection unit 217.

The storage apparatus 230 is used for storing an enormous amount of image data as learning images, or used for storing network parameters generated during learning. The image processing system 210 exchanges data with the storage apparatus 230 via a storage driving unit 214 and a storage connection unit 215 included in the system.

The present embodiment will be explained on the assumption that, but without being limited thereto, the system illustrated in FIG. 2 is used during the learning process and the image processing apparatus 100 illustrated in FIG. 1 is used during the inference process. For example, the system illustrated in FIG. 2 can also perform the inference process. In addition, although the present embodiment assumes the training images to be Bayer array images, it may use images captured by a three-plate type image capturing sensor, or images captured by a vertical color separation type image capturing sensor such as a FOVEON sensor. Not only for the Bayer array, the same goes for other arrangements (such as honeycomb structure, X-Trans CMOS sensor filter array, or the like). Bayer array images may be kept in one channel of the Bayer array, or may be separated into each color channel for training images. Furthermore, although the present embodiment assumes that a single training image is input to, or output from, the neural network, any neural network may be used that allows a plurality of images to be input thereto or output therefrom.

First Embodiment

A first embodiment will be described below. In the following, there will be described an example of performing image noise processing by inputting an image having an M-bit depth per pixel and using a neural network for an image with an N-bit depth that is smaller than M bits. In the present embodiment, there will be described a case where M is 14 and N is 8, in order to illustrate a specific example.

First, there will be described an inference process performed by the image processing apparatus 100, referring to FIGS. 3A, 3B, 4A to 4C, and 5A to 5C. In addition, the image capturing device 102 of the embodiment is intended to output image data formed of 14 bits per pixel.

First, at S301 of the flowchart in FIG. 3A, the CPU 106 sets the parameters for the neural network recorded in the ROM 105 to the neural network in the image processing unit 104. Next, at S302, the CPU 106 acquires a first image from the image capturing device 102, and supplies the acquired first image (image with a 14-bit depth) to the image processing unit 104. Subsequently, at S303, the CPU 106 controls the image processing unit 104 to perform the correction process. The correction process described here is one for eliminating variation in the optical lens 101 or the image capturing device 102, such as for example, correction of peripheral brightness or correction of sensitivity variation for each pixel. However, this step may be skipped when the correction process need not be performed.

Next, at S304, the CPU 106 controls the image processing unit 104 to apply a digital gain. The processing of the digital gain is one that, when a pixel value has an offset, subtracts the offset therefrom, subsequently applies a gain, and adds the offset thereafter.

Next, at S305, the CPU 106 controls the image processing unit 104 to generate a second image acquired by subtracting the offset from each pixel value of the image having the digital gain applied thereto at S304. The offset mentioned here refers to a black level added by the image capturing device 102. Although the present embodiment provides an example of subtracting an offset, this step may be skipped when the process of subtracting the offset need not be performed.

Next, at S306, the CPU 106 controls the image processing unit 104 to generate a third image by clipping an 8-bit segment from a first position of each pixel value in the second image. The 8-bit clipping segment mentioned here is assumed to be the 8 bits from the most significant bit position (bit 13) to lower bits, as illustrated in FIG. 4A. Here, the number in each frame in the drawing indicates the bit position. The 14-bit pixel value is represented from bit 0 (least significant bit) to bit 13 (most significant bit).

Next, at S307, the CPU 106 controls the image processing unit 104 to input the third image into the first neural network. The first neural network mentioned here is one that is optimally learned to perform noise elimination for an image of clipped upper 8 bits.

Next, at S308, the CPU 106 controls the image processing unit 104 to generate a fourth image by limiting each pixel value of the second image to 4095 (12 bits). In other words, a pixel value included in the fourth image is either expressed as it is by 12 bits when a certain pixel value in the second image is equal to or lower than 4095, or replaced by the maximum value of "4095" that can be expressed by 12 bits when a certain pixel value in the second image exceeds 4095. It is to be understood that the "limit" described below has a similar meaning.

Next, at S309, the CPU 106 controls the image processing unit 104 to generate a fifth image by clipping an 8-bit segment from a second position of each pixel value in the fourth image. The 8-bit clipping segment mentioned here is assumed to be the 8 bits from a position shifted to right by 2 bits from the most significant bit, as illustrated in FIG. 4B. Next, at S310, the CPU 106 controls the image processing unit 104 to input the fifth image into the second neural network. The second neural network mentioned here is one that is optimally learned to perform noise elimination for an image shifted to right by two bits from the most significant bit.

Next, at S311, the CPU 106 controls the image processing unit 104 to generate a sixth image by limiting each pixel value of the second image to 1023. Subsequently, at S312, the CPU 106 controls the image processing unit 104 to generate a seventh image by clipping an 8-bit segment from a third position of each pixel value of the sixth image. The 8-bit clipping segment mentioned here is assumed to be the 8 bits from a position shifted to right by 4 bits from the most significant bit, as illustrated in FIG. 4C. Next, at S313, the CPU 106 controls the image processing unit 104 to inputs the seventh image into the third neural network. The third neural network mentioned here is one that is optimally learned to perform noise elimination for an image shifted to right by 4 bits from the most significant bit.

Figure 5A:
FIGS. 5A to 5C are schematic diagrams of bit shift, which is common to all embodiments.

Next, at S314, the CPU 106 controls the image processing unit 104 to generate a ninth image by shifting, to left by six bits, each pixel value of an eighth image output from the first neural network. Each pixel value of the ninth image mentioned here has data set to the upper 8 bits, and a value 0 is set to the lower 6 bits 8 to 13, as illustrated in FIG. 5A.

Figure 5B:
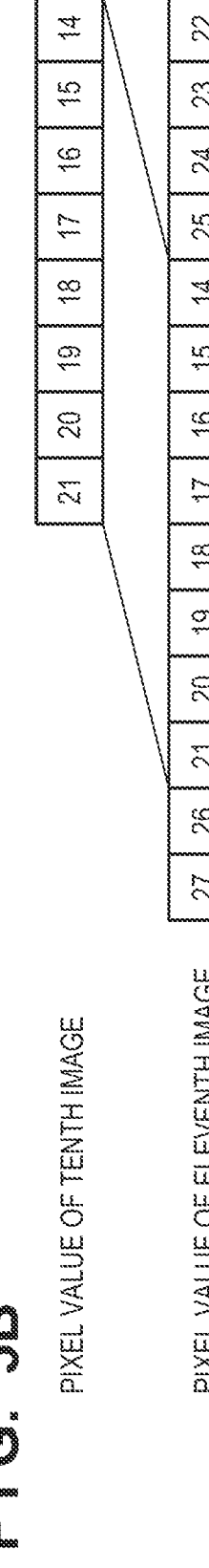

Next, at S315, the CPU 106 controls the image processing unit 104 to generate an 11th image by shifting, to left by 4 bits, each pixel value of a 10th image output from the second neural network. Each pixel value of the 11th image mentioned here has data set to the 8 bits from a position shifted to left from the least significant bit by 4 bits, and a value 0 is set to the other bits 22 to 27, as illustrated in FIG. 5B.

Figure 5C:
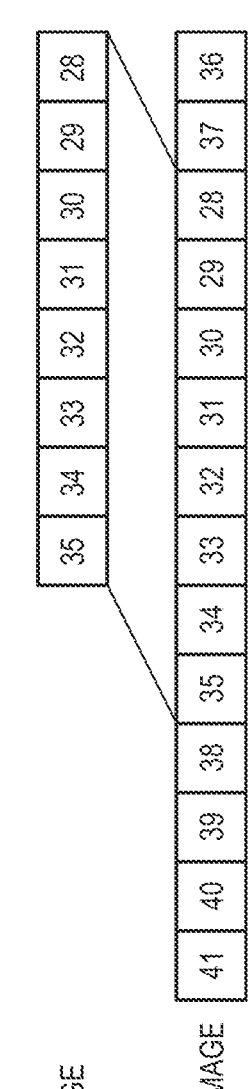

Next, at S316, the CPU 106 controls the image processing unit 104 to generate a 13th image by shifting, to left by 2 bits, each pixel value of a 12th image output from the third neural network. Each pixel value of the 13th image mentioned here has data set to the 8 bits from a position shifted to left from the least significant bit by 2 bits, and a value 0 is set to the other bits 36 to 41, as illustrated in FIG. 5C.

Next, at S317 (FIG. 3B), the CPU 106, the image processing unit 104 initializes a variable I used for indicating each pixel to 0. Subsequently, at S318, the CPU 106, the image processing unit 104 determines whether or not a selection process has been performed for all the pixels to select which pixel value is to be output from the image generated at S314 to S316. Upon determining that the selection process has been completed for all the pixels, the CPU 106 advances the process to S325. On the other hand, upon determining that there exists an unselected pixel, the CPU 106 advances the process to S319.

At S319, the CPU 106 determines whether or not the I-th pixel value of the ninth image is equal to or larger than 4096. Upon determining that the I-th pixel value is equal to or larger than 4096, the CPU 106 advances the process to S320. Next, at S320, the CPU 106 selects and outputs a pixel of the ninth image as the I-th pixel of the image data to be generated.

On the other hand, upon determining at S319 that the I-th pixel value of the ninth image is smaller than 4096, the CPU 106 advances the process to S321. At S321, the CPU 106 determines whether or not the I-th pixel value of the ninth image is equal to or larger than 1024. Upon determining that the I-th pixel value is equal to or larger than 1024, the CPU 106 advances the process to S322. At S322, the CPU 106 selects and outputs the pixel of the 11th image as the I-th pixel of the image data to be generated.

On the other hand, upon determining at S321 that the I-th pixel value of the ninth image is smaller than 1024, the CPU 106 advances the process to S323. At S323, the CPU 106 selects and outputs a pixel of the 13th image as the I-th pixel of the image data to be generated.

Next, at S324, the CPU 106 increments the variable I and returns the process to S318, and repeats the S318 to S324 until the selection process is completed for all the pixels.

At the final S325, the CPU 106 controls the image processing unit 104 to generate a 14th image by adding an offset to the image data acquired as described above. Here, this process is skipped when the process at S305 has not been performed. Although the present embodiment takes 4095 or 1023 as an exemplary limit value and 4096 or 1024 as an exemplary threshold value for determination, the invention is not limited thereto and any value may be employed as the limit value or the threshold value. In addition, although the present embodiment uses a method of selecting pixel values for each neural network to generate the final image, the method is not limited thereto and may be summing, obtaining a mean or a weighted mean. In addition, although the present embodiment applies a digital gain before inputting an image to the neural network, the digital gain may be applied after the image has been subjected to the neural network. In this case, there are prepared neural networks that have been optimally learned using an image before applying a digital gain.

Figure 6:
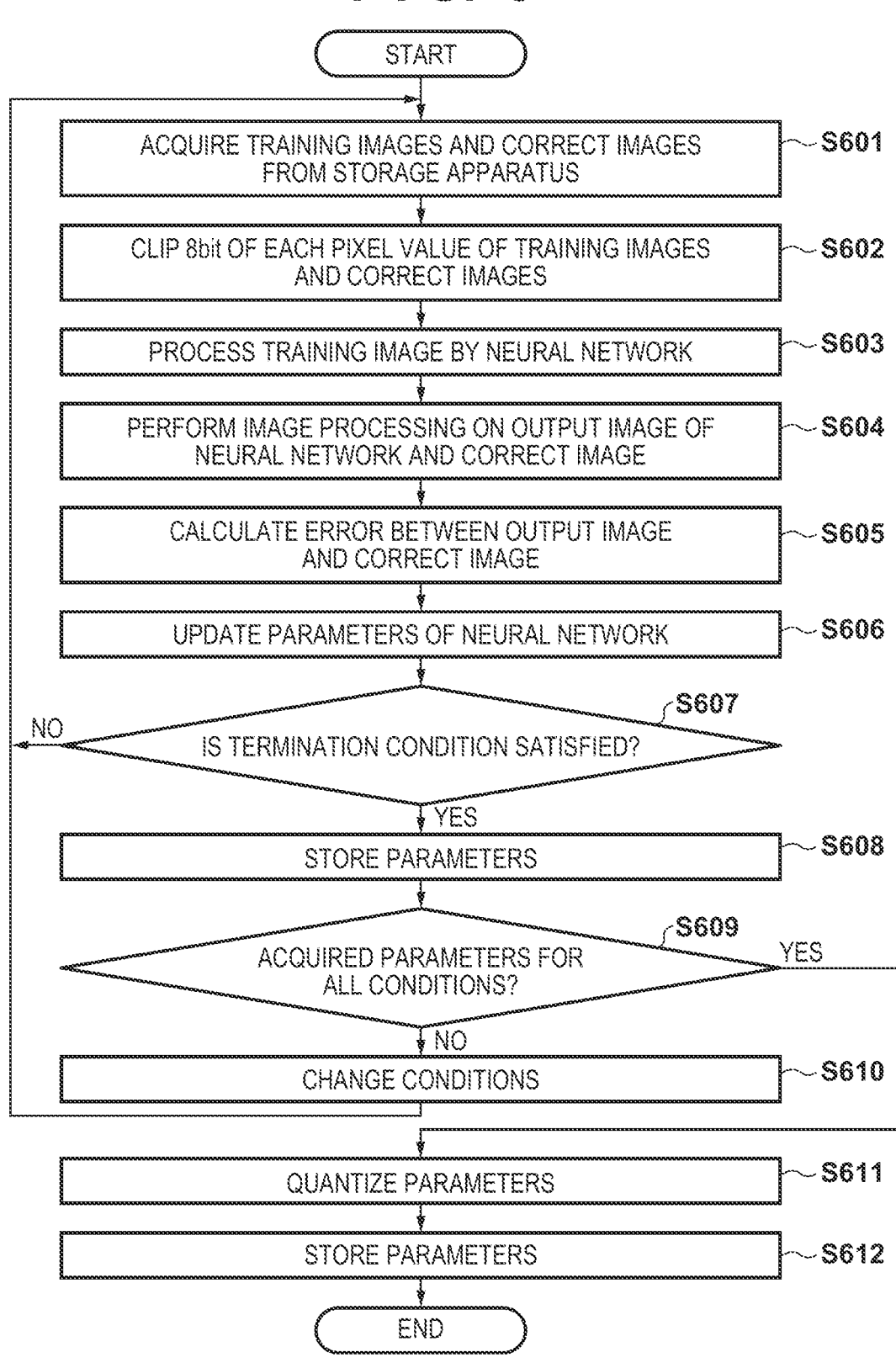
FIG. 6 is a flowchart of a learning process according to the first embodiment.

Next, there will be described a learning process performed in the image processing apparatus 200, the image processing system 210, the display apparatus 220, and the storage apparatus 230, referring to FIGS. 6 and 7. FIG. 6 is a flowchart in a learning process.

First, at S601, the CPU 106 acquires a training image (noise image) and a correct image (supervisory image) from the storage apparatus 230. Here, a training image is an image including noise. A correct image is an image including a same object as that of the training image, with no (or very little) noise. The training image can be generated by adding, through simulation, noise to the correct image having little influence of noise. In addition, it is also possible to use an image capturing the same object as that of the correct image under a situation where noise may actually occur (e.g., high sensitivity setting). In this case, for example, the training image is an image captured with low sensitivity, and the correct image is either an image captured with high sensitivity or an image corrected to have a similar luminance to that of the correct image by performing sensitivity correction on an image captured under low illuminance. The noise pattern or the structure of the object (edge or the like) that are not included in the learning process cannot be inferred with a high precision in the following inference process. Accordingly, the CPU 106 acquires at S601 a plurality of training images and correct images corresponding thereto, so that various noise patterns and structures of the object are included. Here, there may be a single noise amount, or a plurality of noise amounts may be mixed.

Next, at S602, the CPU 106 performs a process of clipping 8 bits from each pixel value of both the training images and the correct images acquired at S601. Clipping of 8 bits, as illustrated in FIGS. 4A to 4C, is selectively performed as appropriate in accordance with a pattern desired to be learned. It is preferred to normalize the training image and the correct image by dividing them by an upper limit value of signals (saturation brightness value). Here, although learning is performed with precision of pixel values reduced to INT8 by taking into account inputting pixel values in units of 8 bits when performing inference, learning may be performed with the precision maintained at FP32.

Next, at S603, the CPU 106 selects at least one of the plurality of training images generated at S602, and inputs the selected training image into the neural network of the image processing unit 104 to generate an output image. The noise amount in the training image used in the learning process, at this time, may be identical to, or different from, the amount in other training images.

Here, a process performed in the neural network 700 will be described, referring to FIG. 7. FIG. 7 is a diagram illustrating a neural network, and description will be made taking a Convolutional Neural Network (CNN) as an example; however, the present embodiment is not limited thereto and may use a Generative Adversarial Network (GAN), may include a skip connection, or may use recursive type such as a Recurrent Neutral Network (RNN).

Figure 7:
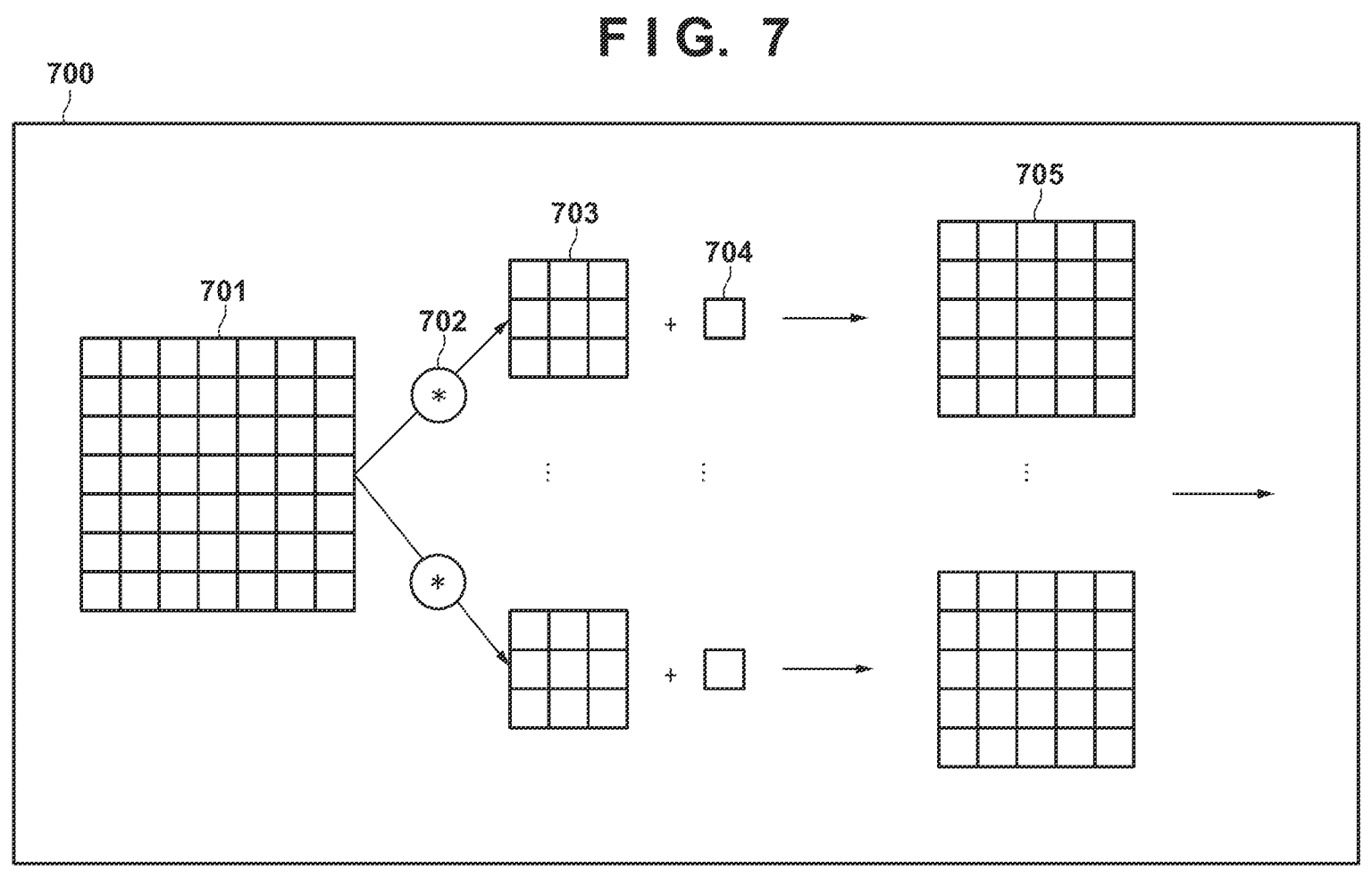

In FIG. 7, an input image 701 represents an image or a feature map described below, being input to the neural network. A convolution operation symbol 702 represents a convolution operation. A convolution matrix 703 is a filter for performing a convolution operation on the input image 701. A bias 704 is added to a result output by the convolution operation on the input image 701 and the convolution matrix 703. A feature map 705 is a result of the convolution operation acquired by adding the bias 704. Although FIG. 7 illustrates small numbers for each of neurons, intermediate layers, and channels for simplicity, the numbers of neurons and layers, and the numbers of inter-neuron combinations or weights are not limited thereto. In addition, the inter-neuron combinations or weights may be reduced when being implemented in an FPGA or the like. Although the learning process and the inference process are collectively executed on a plurality of color channels in the present embodiment, the learning process and the inference process may be individually executed on each color.

A CNN can acquire a feature map of the input image by executing a convolution operation on the input image through a certain filter. Here, the size of the filter is not particularly limited. In the next layer, a different feature map is acquired by executing a convolution operation on the feature map of the previous layer through another filter. In each layer, a certain input signal is multiplied by a weight of a filter representing the strength of connection, and the product is summed with the bias. Applying an activation function to the result provides an output signal at each neuron. The weight and the bias in each layer are referred to as network parameters, whose values are updated in the learning process. An example of a generally used activation function includes, but is not limited to, a sigmoid function, a ReLU function or the like, among which a Leaky ReLU function expressed by the following formula (1) is used in the present embodiment.

$$f(x)=\max(x,x*0.2) \tag{1}$$

In formula (1), max ( . . . ) represents a function that outputs the maximum value among the plurality of arguments in the parentheses.

Next, at S604, the CPU 106 performs image processing on the output image of the neural network and the correct image, respectively. A process of coordinating the conditions of the image processing performed in the inference process and the image processing performed in the learning process allows for improving the inference precision of the noise reduction process during inference. Here, the timing of performing the image processing may be arbitrary as long as it is performed before S604 and S605. For example, it may be performed at the input side of the neural network. When a plurality of patterns of the noise amount in the training images used in the learning process are applied, noise elimination can be effectively performed even when a captured image including an unlearned noise amount is input during inference. In a case of an insufficient number of training images, a replenishing process such as clipping, rotation, inversion may be performed. In such a case, it is necessary to perform the same process on the correct image.

Next, at S605, the CPU 106 calculates an error between the output image subjected to image processing at S604 and the correct image. The color components of the correct image are arranged similarly to the output image. Although the mean square error of pixels or the total sum of absolute values of the difference between pixels may be used for calculating the error, other indicators may be used for the calculation.

Next, at S606, the CPU 106 updates each parameter using error back propagation so as to reduce the error calculated at S605. However, the present embodiment is not limited thereto. The update amount of each parameter may be fixed or variable.

At S607, the CPU 106 determines whether or not a predetermined termination condition is satisfied and, when the condition is not satisfied, returns the process to S601 to newly start learning. On the other hand, upon determining that the predetermined termination condition is satisfied, the CPU 106 advances the process to S608. The predetermined termination condition mentioned here may be such that the number of learning times has reached a predetermined value, or the aforementioned error has become a predetermined value or less. Alternatively, the predetermined termination condition may be such that the aforementioned error no longer decreases, or the process may be terminated according to the user's determination.

Next, at S608, the CPU 106 stores, in the storage apparatus 230, information related to the network parameters updated by learning, or the structure of the neural network. The storage apparatus 230 may be used for storing the output network parameters. Although the present embodiment is described assuming that the storage apparatus is used for storing, other types of storage medium may also be used.

At the next step S609, the CPU 106 determines whether or not the network parameters have been acquired under all the conditions. As has been described above, coordinating the conditions of the inference process and the learning process allows for improving the inference precision of the noise reduction process during inference. When there is a case in which image processing is performed under a plurality of conditions (or switching conditions) in inference, it is desirable to prepare network parameters for each condition.

Upon determining at S609 that the network parameters have been acquired for all the conditions, the CPU 106 advances the process to S611. Alternatively, upon determining that the network parameters have not been acquired for all the conditions, the CPU 106 advances the process to S610 to change the conditions, and subsequently performs the flow from S601 again. The network parameters are stored in a parameter storage area for each condition. The parameter storage area may be either the ROM 105 or the RAM 107. In addition, the network parameters stored in the parameter storage area may also be stored in the storage apparatus 230 as necessary.

At S611, the CPU 106 performs quantization in order to convert, into INT8, the parameters of the neural network learned with FP32. The bit width and the data type are not limited thereto, and parameters of FP16 may be used, or quantization may be performed into INT4.

Finally, at S612, the CPU 106 stores the quantized network parameters in a parameter storage area.

As has been described above, acquiring and keeping optimal network parameters for each condition allows for acquiring a neural network whose inference precision is robust against the influence of image processing that may change depending on the condition.

Here, the learning process can also be executed for processes other than noise reduction by preparing pairs of training images and correct images by simulation in a similar manner. For super resolution, training images can be prepared by down-sampling the correct images. For this case, sizes of the correct images and the training images may or may not be adjusted. For blur elimination or shake elimination (deblur), the training image can be prepared by applying a blur function to the correct image. For white balance correction, it suffices to select, as a training image, an image with inappropriately aligned or uncorrected white balance with respect to the correct image captured with appropriate white balance. The same goes for color correction such as color matrix correction. For deficiency interpolation, a training image can be acquired by providing deficiency in the correct image. For demosaicing, a training image may be prepared by preparing a correct image using a three-plate type image capturing device or the like, and re-sampling the correct image using a Bayer array or the like. For color component inference, a training image can be prepared by reducing a color component from the correct image. For dehazing, a training image can be prepared by providing the haze-free correct image with scattered light through simulation of a physical phenomenon. When there are a plurality of consecutive frames such as in a movie, inputting a desired number of frames to the neural network collectively in the depth direction allows for eliminating noise more effectively.

Second Embodiment

Next, there will be described an inference process performed by the image processing apparatus 100 in a second embodiment according to the present invention, referring to FIGS. 8A, 8B and 9.

In the flowcharts of FIGS. 8A and 8B, the same process steps as those in the first embodiment are provided with the same step numbers as those in FIG. 3, with description thereof being omitted.

Steps S301 to S304 are similar to those of the first embodiment (FIG. 3A). Next, at S805, the CPU 106 controls the image processing unit 104 to calculate the mean of the pixel values for each predetermined area. The predetermined area mentioned here refers to, for example, each of 9 areas of an image divided by 3×3 as illustrated in FIG. 9, with the mean of the pixel values being calculated for each area. Area division is not limited thereto and division into smaller areas or larger areas, or division into other shapes instead of a rectangular area are also possible. In dividing area, divided areas may overlap with each other. In addition, the value calculated for each area may not be the mean.

Next, at S806 (FIG. 8B), the CPU 106 initializes the variable I used for indicating each pixel to 0. Next, at S807, the CPU 106 determines whether or not all the areas divided at S805 have been selected. Upon determining that selection of all the areas has been completed, the CPU 106 advances the process to S825. Alternatively, upon determining that there remains an unselected area, the CPU 106 advances the process to S808.

At S808, the CPU 106 controls the image processing unit 104 to calculate the mean over the I-th area, and determines whether or not the value is equal to or larger than 4096. When the mean over the I-th area is equal to or larger than 4096, the CPU 106 advances the process to S809. At S809, the CPU 106 sets the parameters of the first neural network recorded in the ROM 105 to the neural network in the image processing unit 104. Next, at S810, the CPU 106 controls the image processing unit 104 to generate a 15th image by clipping an 8-bit segment from a first position of each pixel value of the I-th area. Next, at S811, the CPU 106 controls the image processing unit 104 to input the 15th image to the neural network. Next, at S812, the CPU 106 controls the image processing unit 104 to generate a 17th image by shifting, to left by 6 bits, each pixel value of a 16th image output from the neural network.

On the other hand, upon determining at S808 that the mean over the I-th area is smaller than 4096, the CPU 106 advances the process to S813. At step S813, the CPU 106 controls the image processing unit 104 to calculate the mean over the I-th area, and determines whether or not the value is equal to or larger than 1024. Upon determining that the mean over the I-th area is equal to or larger than 1024, the CPU 106 advances the process to S814. At step S814, the CPU 106 sets the parameters for the second neural network recorded in the ROM 105 to the neural network in the image processing unit 104. Next, at S815, the CPU 106 controls the image processing unit 104 to generate an 18th image by limiting each pixel value of the I-th area to 4095. Next, at S816, the CPU 106 controls the image processing unit 104 to generate a 19th image by clipping an 8-bit segment from a second position of each pixel value of the I-th area. Next, at S817, the CPU 106 controls the image processing unit 104 to input the 19th image to the neural network. Subsequently, at S818, the CPU 106 controls the image processing unit 104 to generate a 21st image by shifting, to left by 4 bits, each pixel value of a 20th image output from the neural network.

On the other hand, upon determining at S813 that the mean over the I-th area is smaller than 1024, the CPU 106 advances the process to S819. At step S819, the CPU 106 sets the parameters of the third neural network recorded in the ROM 105 to the neural network in the image processing unit 104. Next, at S820, the CPU 106 controls the image processing unit 104 to generate a 22nd image by limiting each pixel value of the I-th area to 1023. Subsequently, at S821, the CPU 106 controls the image processing unit 104 to generate a 23rd image by clipping an 8-bit segment from a third position of each pixel value of the I-th area. Next, at S822, the CPU 106 controls the image processing unit 104 to input the 11th image to the neural network. Subsequently, at S823, the CPU 106 controls the image processing unit 104 to generate a 25th image by shifting, to left by 2 bits, each pixel value of a 24th image output from the neural network. The bit clipping and bit shifting described here are similar to the method described by referring to FIGS. 4A to 4C and 5A to 5C.

At S824, the CPU 106 increments the variable I and returns the process to S807, and repeats the process on all the areas.

At the final S825, the CPU 106 controls the image processing unit 104 to generate a 26th image by adding an offset to the image generated from the output image of the neural network for each area. Although the present embodiment takes 4095 or 1023 as an exemplary limit value and 4096 or 1024 as an exemplary threshold value for determination, the invention is not limited thereto and any value may be employed as the limit value or the threshold value. In addition, although the present embodiment applies a digital gain before inputting an image to the neural network, the digital gain may be applied after the image has been subjected to the neural network. In this case, there are prepared neural networks that have been optimally learned using an image before applying a digital gain.

Third Embodiment

Next, there will be described an inference process performed by the image processing apparatus 100 according to a third embodiment, referring to the flowcharts of FIGS. 10A and 10B. In the flowcharts of FIGS. 10A and 10B, the same process steps as those in the first embodiment are provided with the same step numbers as those in FIG. 3, with description thereof being omitted.

Steps S302 to S304 are similar to those of the first embodiment (FIG. 3A). Next, at S1004, the CPU 106 controls the image processing unit 104 to detect an area including a desired body (object). For body detection, deep learning may be used that performs body detection, or a scheme using machine learning or support vector machines may be employed. Next, at S1005, the CPU 106 controls the image processing unit 104 to generate a 27th image by subtracting an offset from each pixel value of the area detected at S1004. The offset mentioned here refers to the black level added by the image capturing device 102. Next, at S1006, the CPU 106 calculates the mean (or average) of the pixel values of the 27th image.

At S1007 (FIG. 10B), CPU 106 determines whether or not the mean of the 27th image is equal to or larger than 4096. Upon determining that the mean of the 27th image is equal to or larger than 4096, the CPU 106 advances the process to S1008. At step S1008, the CPU 106 sets the parameters of the first neural network recorded in the ROM 105 to the neural network in the image processing unit 104. Subsequently, at S1009, the CPU 106 controls the image processing unit 104 to generate a 28th image by clipping an 8-bit segment from a first position of each pixel value of the 27th image. Next, at S1010, the CPU 106 controls the image processing unit 104 to input the 28th image to the neural network. Next, at 51011, the CPU 106 controls the image processing unit 104 to generate a 30th image by shifting, to left by 6 bits, each pixel value of a 29th image output from the neural network.

On the other hand, upon determining at S1007 that the mean of the 27th image is smaller than 4096, the CPU 106 advances the process to S1012. At S1012, the CPU 106 controls the image processing unit 104 to calculate the mean of the 27th image, and determines whether or not the value is equal to or larger than 1024. Upon determining that the mean of the 27th image is equal to or larger than 1024, the CPU 106 advances the process to S1013. At S1013, the CPU 106 sets the parameters of the second neural network recorded in the ROM 105 to the neural network in the image processing unit 104. Subsequently, at S1014, the CPU 106 controls the image processing unit 104 to generate a 31st image by limiting each pixel value of the 27th image to 4095. Next, at S1015, the CPU 106 controls the image processing unit 104 to generate a 32nd image by clipping an 8-bit segment from a second position of each pixel value of the second image. Subsequently, at S1016, the CPU 106 controls the image processing unit 104 to input the seventh image to the neural network. Subsequently, at S1017, the CPU 106 controls the image processing unit 104 to generate a 34th image by shifting, to left by 4 bits, each pixel value of a 33rd image output from the neural network.

On the other hand, upon determining at S1012 that the mean of the 27th image is smaller than 1024, the CPU 106 advances the process to S1018. At S1018, the CPU 106 sets the parameters of the third neural network recorded in the ROM 105 to the neural network in the image processing unit 104. Subsequently, at S1019, the CPU 106 controls the image processing unit 104 to generate a 35th image by limiting each pixel value of the 27th image to 1023. Subsequently, at S1020, the CPU 106 controls the image processing unit 104 to generate a 36th image by clipping an 8-bit segment from a third position of each pixel value of the 35th image. Next, at S1021, the CPU 106 controls the image processing unit 104 to input the 36th image to the neural network. Subsequently, at S1022, the CPU 106 controls the image processing unit 104 to generate a 38th image by shifting, to left by two bits, each pixel value of a 37th image output from the neural network. The bit clipping and bit shifting described here are similar to the method described by referring to FIGS. 4A to 4C and 5A to 5C.

Finally, at S1023, the CPU 106 controls the image processing unit 104 to generate a 39th image by adding an offset. Although the present embodiment takes 4095 or 1023 as an exemplary limit value and 4096 or 1024 as an exemplary threshold value for determination, the invention is not limited thereto and any value may be employed as the limit value or the threshold value. In addition, although the present embodiment applies a digital gain before inputting an image to the neural network, the digital gain may be applied after the image has been subjected to the neural network. In this case, there is prepared a neural network that has been optimally learned using an image before applying a digital gain.

Fourth Embodiment

Figure 11:
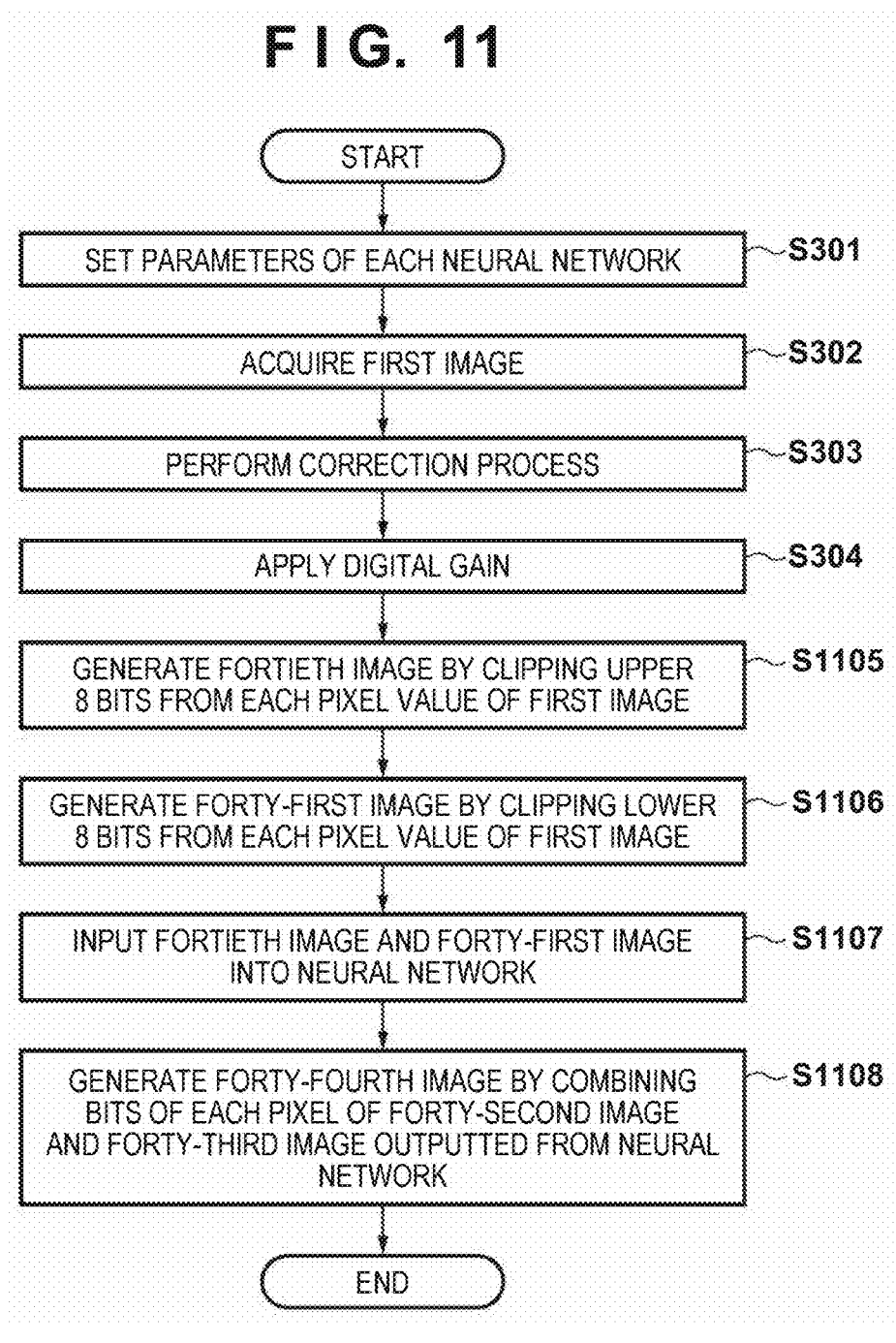
FIG. 11 is a flowchart of an inference process according to a fourth embodiment.

The inference process performed by the image processing apparatus 100 in the fourth embodiment is described by referring to FIGS. 11, 12A to 12D, 13A to 13D, and 14A to 14D. In the flowchart of FIG. 11, the same process steps as those in the first embodiment are provided with the same step numbers as those in FIG. 3A, with description thereof being omitted.

Steps S301 to S304 are similar to those of the first embodiment (FIG. 3A). Next, at S1105, the CPU 106 controls the image processing unit 104 to generate a 40th image by clipping upper bits from each pixel value of the first image having the digital gain applied thereto at S304. For example, when the bit depth of each pixel value is 16 bits, an image is generated by clipping the upper 8 bits, as illustrated in FIG. 12A. When the bit depth of each pixel value is 14 bits, an image is generated by clipping the upper 8 bits, as illustrated in FIG. 12B. Alternatively, the upper 7 bits may be clipped as illustrated in FIG. 12C, or the upper 6 bits may be clipped as illustrated in FIG. 12D. When the upper 7 bits are clipped, the value is shifted to right by 1 bit from the most significant bit to acquire an 8-bit bit depth. Alternatively, the value is shifted to left by 1 bit from the least significant bit. When the upper 6 bits are clipped, the value is shifted to right by 2 bits from the most significant bit to acquire an 8-bit bit depth. Alternatively, the value is shifted to left by 2 bits from the least significant bit.

At S1106, the CPU 106 controls the image processing unit 104 to generate a 41st image by clipping lower bits from each pixel value of the image having the digital gain applied thereto at S304. For example, when the bit depth of each pixel value is 16 bits, an image is generated by clipping the lower 8 bits, as illustrated in FIG. 13A. When the bit depth of each pixel value is 14 bits, an image is generated by clipping the lower 8 bits, as illustrated in FIG. 13B. Alternatively, the lower 7 bits may be clipped as illustrated in FIG. 13C, or the lower 6 bits may be clipped as illustrated in FIG. 13D. When the lower 7 bits are clipped, the value is shifted to right by 1 bit from the most significant bit to acquire an 8-bit bit depth. Alternatively, the value is shifted to left by 1 bit from the least significant bit. When the lower 6 bits are clipped, the value is shifted to right by 2 bits from the most significant bit to acquire an 8-bit bit depth. Alternatively, the value is shifted to left by 2 bits from the least significant bit.

At S1107, the CPU 106 controls the image processing unit 104 to input the 40th image and the 41st image to the neural network. The neural network mentioned here is one that performs optimally learned noise elimination by evaluating a noise-containing training image divided into an image generated by clipping upper bits and an image generated by clipping lower bits, with a noise-free correct image divided into an image generated by clipping upper bits and an image generated by clipping lower bits. Although the present embodiment combines the 40th image and the 41st image in the channel direction to achieve multi-channeling and inputs the combined image to the neural network, the present invention is not limited thereto and images may be input in a manner combined in vertical or horizontal directions.

At S1108, the CPU 106 controls the image processing unit 104 to generate a 44th image by combining the bits of corresponding pixel values of the 42nd image and the 43rd image output from the neural network. The bit combination mentioned here is a process of concatenating the 42nd image as upper bits and the 43rd image as lower bits, of each corresponding pixel value of the 42nd image and the 43rd image output from the neural network. The relation between the image output from the neural network and the bit positions will be described below in the learning process. For example, the pixel value of the 42nd image is set as the upper 8 bits and the pixel value of the 43rd image is set as the lower 8 bits and those are concatenated into 16 bits, as illustrated in FIG. 14A. When concatenating into 14 bits, the upper or lower 7 bits of the 8 bits of the pixel value of the 42nd image may be set as the upper bits and the upper or lower 7 bits of the 8 bits of the pixel value of the 43rd image may be set as the lower bits and those may be concatenated into 14 bits, as illustrated in FIG. 14B, for example. Alternatively, the 8 bits of the pixel value of the 42nd image and the upper or lower 6 bits of the 8 bits of the pixel value of the 43rd image may be concatenated, or the upper or lower 6 bits of the 8 bits of the pixel value of the 42nd image and the 8 bits of the pixel value of the 43rd image may be concatenated. In addition, 8 bits of the pixel value of the 42nd image and 8 bits of the pixel value of the 43rd image may be concatenated into 14 bits, as illustrated in FIG. 14C. In this case, an overlapping process on the lower two bits of the pixel value of the 42nd image and the upper two bits of the pixel value of the 43rd image is performed to concatenate as a new set of 2 bits. The overlapping process may calculate the mean, or select one therefrom.

Although the present embodiment applies a digital gain before inputting an image to the neural network, the digital gain may be applied after the image has been subjected to the neural network. In this case, there is prepared a neural network that has been optimally learned using an image before applying a digital gain.

Although the present embodiment is applied for the pixel values of images of 16 or 14 bits, the present embodiment is applicable to pixel values of 9 bits or more. In addition, the clipping of bits illustrated in FIGS. 12A to 12D and 13A to 13D, and the concatenation of bits illustrated in FIGS. 14A to 14C can be changed depending on the number of bits included in the pixel values and any combination thereof may be used.

Next, there will be described a learning process performed in the image capturing apparatus 200, the image processing system 210, the display apparatus 220, and the storage apparatus 230 in the present embodiment, referring to FIG. 15.

In the flowchart of FIG. 15, process steps that perform similar processing to those in the first embodiment are provided with the same step numbers as those in FIG. 6, with description thereof being omitted.

Step S601 in FIG. 15 is identical to that of FIG. 6. At S1502, the CPU 106 performs a process of clipping upper bits from each pixel value of the training image acquired at S601. Clipping of upper bits, as illustrated in FIGS. 12A to 12D, is selectively performed as appropriate in accordance with a pattern desired to be learned.

At S1503, the CPU 106 performs a process of clipping lower bits from each pixel value of the training image acquired at S601. Clipping of lower bits, as illustrated in FIGS. 13A to 13D, is selectively performed as appropriate in accordance with a pattern desired to be learned.

Next, at S1504, the CPU 106 performs a process of clipping upper bits from each pixel value of the correct image acquired at S601. Clipping of upper bits, as illustrated in FIGS. 12A to 12D, is selectively performed as appropriate in accordance with a pattern desired to be learned.

At S1505, the CPU 106 performs a process of clipping lower bits from each pixel value of the correct image acquired at S601. Clipping of lower bits, as illustrated in FIGS. 13A to 13D, is selectively performed as appropriate in accordance with a pattern desired to be learned.

It is preferred to normalize the training images and the correct images by dividing them by an upper limit value of signals (saturation brightness value). Here, although learning is performed with precision of pixel values reduced to INT8 by taking into account inputting pixel values in units of 8 bits when performing inference, learning may be performed with the precision maintained at FP32.

At S1506, the CPU 106 combines the training image generated at S1502 and the training image generated at S1503 in the channel direction to achieve multi-channeling, and inputs the combined image to the neural network of the image processing unit 104 to generate an output image. The noise amount in the training image used in the learning process, at this time, may be the same as, or changed from, the amount in other training images. The output image mentioned here uses the image generated by clipping upper bits at S1504 and the image generated by clipping lower bits at S1505 as correct images, and therefore two images will be output, one extracted as upper bits and the other extracted as lower bits. Subsequent steps S604 to S612 are similar to those in FIG. 6.

As has been described above, acquiring and keeping optimal network parameters for each condition allows for acquiring a neural network whose inference precision is robust against the influence of image processing that may change depending on the condition.

Here, the learning process can also be executed for processes other than noise reduction by preparing pairs of training images and correct images by simulation in a similar manner. For super resolution, training images can be prepared by down-sampling the correct images. For this case, sizes of the correct images and the training images may or may not be adjusted. For blur elimination or shake elimination (deblur), the training image can be prepared by applying a blur function to the correct image. For white balance correction, it suffices to select, as a training image, an image with inappropriately aligned or uncorrected white balance with respect to the correct image captured with appropriate white balance. The same goes for color correction such as color matrix correction. For deficiency interpolation, a training image can be acquired by providing deficiency in the correct image. For demosaicing, a training image may be prepared by preparing a correct image using a three-plate type image capturing device or the like, and re-sampling the correct image using a Bayer array or the like. For color component inference, a training image can be prepared by reducing a color component from the correct image. For dehazing, a training image can be prepared by providing the haze-free correct image with scattered light through simulation of a physical phenomenon. When there are a plurality of consecutive frames such as in a movie, inputting a desired number of frames to the neural network collectively in the depth direction allows for eliminating noise more effectively.

Fifth Embodiment

Next, there will be described an inference process performed by the image processing apparatus 100 in a fifth embodiment, referring to the flowchart of FIG. 16. In the flowchart of FIG. 16, process steps that perform the same processing as those in FIG. 3A are provided with the same step numbers, with description thereof being omitted. Additionally, in FIG. 16, process steps that perform the same processing in FIG. 11 are provided with the same step numbers, with description thereof being omitted.

Steps S301 to S304 in FIG. 16 are identical to those in FIG. 3A. In addition, steps S1105 to S1106 in FIG. 16 are identical to those in FIG. 11.

At S1607, the CPU 106 controls the image processing unit 104 to input the 40th image and the 41st image to the neural network. The neural network mentioned here is one that performs optimally learned noise elimination by evaluating a noise-containing training image divided into an image generated by clipping upper bits and an image generated by clipping lower bits, with a noise-free correct image subjected to a tone compression process after an offset has been subtracted therefrom. The offset mentioned here is the black level added by the image capturing device 102. In addition, the tone compression process mentioned here may employ various methods. For example, gamma correction may be used.

At S1608, the CPU 106 controls the image processing unit 104 to generate a 46th image by performing a tone expansion process on each pixel value of a 45th image output from the neural network. The tone expansion process mentioned here may employ various methods. For example, degamma correction may be used.

At S1609, the CPU 106 controls the image processing unit 104 to generate a 47th image by adding an offset to each pixel value of the fifth image.

Although the present embodiment applies a digital gain before inputting an image to the neural network, the digital gain may be applied after the image has been subjected to the neural network. In this case, there is prepared a neural network that has been optimally learned using an image before applying a digital gain.

Although the present embodiment is applied for the pixel values of images of 16 or 14 bits, the present embodiment is applicable to pixel values of 9 bits or more. In addition, clipping of bits illustrated in FIGS. 12A to 12D and 13A to 13D, and concatenation of bits illustrated in FIGS. 14A to 14C can be changed depending on the number of bits included in the pixel values and any combination thereof may be used.

Next, there will be described a learning process performed in the image capturing apparatus 200, the image processing system 210, the display apparatus 220, and the storage apparatus 230 in the present embodiment, referring to the flowchart of FIG. 17.

In the flowchart of FIG. 17, process steps that perform the same processing as those in the flowchart of FIG. 6 are provided with the same step numbers as those in FIG. 6, with description thereof being omitted. Additionally, in the flowchart of FIG. 17, process steps that perform the same processing as those in the flowchart of FIG. 15 are also provided with the same step numbers as those in FIG. 15, with description thereof being omitted.

Step S601 is identical to the process step bearing the same step number in FIG. 6. Steps S1502 to S1503 are identical to the process steps bearing the same step numbers in FIG. 15.

At S1704, the CPU 106 performs a process of subtracting an offset from each pixel value of the correct image acquired at S601. At S1705, the CPU 106 performs a tone compression process on each pixel value of the correct image generated at S1704.

It is preferred to normalize the training image and the correct image by dividing them by an upper limit value of signals (saturation brightness value). Here, although learning is performed with precision of pixel values reduced to INT8 by taking into account inputting pixel values in units of 8 bits when performing inference, learning may be performed with the precision maintained at FP32.

At S1706, the CPU 106 combines the training image generated at S1502 and the training image generated at S1503 in the channel direction to achieve multi-channeling, and inputs the combined image to the neural network of the image processing unit 104 to generate an output image. The noise amount in the training image used in the learning process, at this time, may be the same as, or changed from, the amount in other training images. The output image mentioned here uses the image generated at S1705, which is subjected to the tone compression process, as a correct image, and therefore an image will be output whose pixel values have been each subjected to the tone compression process. The subsequent steps S604 to S612 perform the same processing as those bearing the same step numbers in FIG. 6.

As has been described above, acquiring and keeping optimal network parameters for each condition allows for acquiring a neural network whose inference precision is robust against the influence of image processing that may change depending on the condition.

Here, the learning process can also be executed for processes other than noise reduction by preparing pairs of training images and correct images by simulation in a similar manner. For super resolution, training images can be prepared by down-sampling the correct images. For this case, sizes of the correct images and the training images may or may not be adjusted. For blur elimination or shake elimination (deblur), the training image can be prepared by applying a blur function to the correct image. For white balance correction, it suffices to select, as a training image, an image with inappropriately aligned or uncorrected white balance with respect to the correct image captured with appropriate white balance. The same goes for color correction such as color matrix correction. For deficiency interpolation, a training image can be acquired by providing deficiency in the correct image. For demosaicing, a training image may be prepared by preparing a correct image using a three-plate type image capturing device or the like, and re-sampling the correct image using a Bayer array or the like. For color component inference, a training image can be prepared by reducing a color component from the correct image. For dehazing, a training image can be prepared by providing the haze-free correct image with scattered light through simulation of a physical phenomenon. When there are a plurality of consecutive frames such as in a movie, inputting a desired number of frames to the neural network collectively in the depth direction allows for eliminating noise more effectively.

Sixth Embodiment

There will be described an inference process performed by the image processing apparatus 100 in a sixth embodiment, referring to the flowchart of FIG. 18.

In the flowchart of FIG. 18, the process steps that perform similar processing to that in the flowchart of FIG. 3A are provided with the same step numbers as those in FIG. 3A, with description thereof being omitted.

Steps S301 to S304 are identical to those in FIG. 3A. At S1805, the CPU 106 controls the image processing unit 104, and generates a 48th image by subtracting an offset from each pixel value of the image having the digital gain applied thereto at S304. The offset mentioned here is the black level added by the image capturing device 102.

At S1806, the CPU 106 controls the image processing unit 104 to generate a 49th image by performing a tone compression process on each pixel value of the 48th image. The tone compression process mentioned here may employ various methods. For example, gamma correction may be used.

At the subsequent S1807, the CPU 106 controls the image processing unit 104 to input the 49th image to the neural network. The neural network mentioned here is one that performs optimally learned noise elimination by evaluating a noise-containing training image subjected to the gamma process after an offset has been subtracted therefrom, with a noise-free correct image divided into an image generated by clipping upper bits and an image generated by clipping lower bits.

Subsequently, at S1808, the CPU 106 controls the image processing unit 104 to generate a 52nd image by combining the bits of corresponding pixel values of a 50th image and a 51st image output from the neural network. The bit combination mentioned here is similar to the method described by referring to FIGS. 14A to 14C.

Although the present embodiment applies a digital gain before inputting an image to the neural network, the digital gain may be applied after the image has been subjected to the neural network. In this case, there is prepared a neural network that has been optimally learned using an image before applying a digital gain.

Although the present embodiment is applied for the pixel values of images of 16 or 14 bits, the present embodiment is applicable to pixel values of 9 bits or more. In addition, clipping of bits illustrated in FIGS. 12A to 12D and 13A to 13D, and concatenation of bits illustrated in FIGS. 14A to 14C can be changed depending on the number of bits included in the pixel values and any combination thereof may be used.

Next, there will be described a learning process performed in the image capturing apparatus 200, the image processing system 210, the display apparatus 220, and the storage apparatus 230 according to the present embodiment, referring to the flowchart of FIG. 19.

In the flowchart of FIG. 19, the process steps that perform similar processing to those in the flowchart of FIG. 6 are provided with the same step numbers as those in FIG. 6 with description thereof being omitted. In the flowchart of FIG. 19, process steps that perform similar processing to those in the flowchart of FIG. 15 are also provided with the same step numbers as those in FIG. 15, with description thereof being omitted.

Step S601 in FIG. 19 is identical to that of FIG. 6. Next, at the subsequent S1902, the CPU 106 performs a process of subtracting the offset from each pixel value of the training image acquired at S601. Subsequently, at S1903, the CPU 106 performs a tone expansion process on each pixel value of the training image generated at S1902.

It is preferred to normalize the training image and the correct image by dividing them by an upper limit value of signals (saturation brightness value). Here, although learning is performed with precision of pixel values reduced to INT8 by taking into account inputting pixel values in units of 8 bits when performing inference, learning may be performed with the precision maintained at FP32.

Steps S1504 to S1505 are identical to the process steps bearing the same step numbers in FIG. 15. At S1906, the CPU 106 inputs the training image generated at S1903 to the neural network of the image processing unit 104 to generate an output image. The noise amount in the training image used in the learning process, at this time, may be the same as, or changed from, the amount in other training images. The output image mentioned here uses the image generated by clipping upper bits at S1504 and the image generated by clipping lower bits at S1505 as correct images, and therefore two images will be output, one extracted as upper bits and the other extracted as lower bits. Steps S604 to S612 are identical to the process steps bearing the same step numbers in FIG. 6.

As has been described above, acquiring and keeping optimal network parameters for each condition allows for acquiring a neural network whose inference precision is robust against the influence of image processing that may change depending on the condition.

Here, the learning process can also be executed for processes other than noise reduction by preparing pairs of training images and correct images by simulation in a similar manner. For super resolution, training images can be prepared by down-sampling the correct images. For this case, sizes of the correct images and the training images may or may not be adjusted. For blur elimination or shake elimination (deblur), the training image can be prepared by applying a blur function to the correct image. For white balance correction, it suffices to select, as a training image, an image with inappropriately aligned or uncorrected white balance with respect to the correct image captured with appropriate white balance. The same goes for color correction such as color matrix correction. For deficiency interpolation, a training image can be acquired by providing deficiency in the correct image. For demosaicing, a training image may be prepared by preparing a correct image using a three-plate type image capturing device or the like, and re-sampling the correct image using a Bayer array or the like. For color component inference, a training image can be prepared by reducing a color component from the correct image. For dehazing, a training image can be prepared by providing the haze-free correct image with scattered light through simulation of a physical phenomenon. When there are a plurality of consecutive frames such as in a movie, inputting a desired number of frames to the neural network collectively in the depth direction allows for eliminating noise more effectively.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
   (a) at least one processor and at least one memory and/or
   (b) at least one circuit, being configured to function as a plurality of units comprising:
   (1) a first generation unit that generates a plurality of images having an M-bit depth per pixel by inputting an input image having a bit depth of N bits, and clipping M-bit segments from mutually bit different positions, relative to a most significant bit of the N bits, within the N bits;
   (2) a second generation unit including a neural network for an M-bit-depth image and that generates, by inputting the plurality of images generated by the first generation unit into the neural network, a plurality of output images corresponding to each of the plurality of images being input; and
   (3) a third generation unit that generates an image having the N-bit depth from the plurality of output images generated by the second generation unit,
   wherein the M-bit segments include (1) a first M-bit segment whose most significant bit is the most significant bit of the N bits and (2) a second M-bit segment whose most significant bit is not the most significant bit of the N bits.

2. The apparatus according to claim 1, wherein the neural network includes a plurality of neural networks optimally learned for each clipped segment of bits.

3. The apparatus according to claim 1, wherein the third generation unit uses an image output from a neural network that has processed an image clipped from the most significant bit position to generate by selecting, for each pixel, which neural network output image is to be used.

4. The apparatus according to claim 1, wherein the plurality of units further comprises:
   a calculation unit that divides the input image into a plurality of areas and calculate luminance for each area;
   a first selection unit that selects, for each area, a position from which bits are to be clipped, in accordance with the luminance calculated for each area; and
   a second selection unit that selects, for each area, which neural network is to be used, in accordance with the luminance calculated for each area.

5. The apparatus according to claim 1, wherein the plurality of units further comprises:
   a detection unit that detects an object from the input image;
   a calculation unit that calculates luminance of an area including the object;
   a first selection unit that selects, for each area, a position from which bits are to be clipped, in accordance with the calculated luminance; and
   a second selection unit that selects which neural network is to be used, in accordance with the calculated luminance.

6. The apparatus according to claim 1, wherein the first generation unit generates an image having an M-bit depth by clipping the M-bit segment after having limited the image having the N-bit depth by a maximum value expressed by the most significant bit position and the least significant bit 0 when clipping the M-bit segment from the image having the N-bit depth.

7. The apparatus according to claim 1, wherein the neural network is one that is optimally learned to expand in one dimension and input a plurality of images having an M-bit depth generated in the first generation unit, and to be expanded in one dimension and output.

8. The apparatus according to claim 1, wherein the third generation unit expands in one dimension and combines a plurality of images generated from a neural network.

9. A method of controlling an image processing apparatus, the method comprising:
   (a) generating a plurality of images having an M-bit depth per pixel by inputting an input image having a bit depth of N bits and clipping M-bit segments from mutually bit different positions, relative to a most significant bit of the N bits, within the N bits;
   (b) generating, by inputting the plurality of images generated in the step (a) into a neural network for an M-bit-depth image, a plurality of output images corresponding to each of the plurality of images being input; and
   (c) generating an image having the N-bit depth from the plurality of output images generated in the step (b),
   wherein the M-bit segments include (1) a first M-bit segment whose most significant bit is the most significant bit of the N bits, and (2) a second M-bit segment whose most significant bit is not the most significant bit of the N bits.

10. A non-transitory computer-readable storage medium storing a program which, when read and executed by a computer, causes the computer to execute the steps of a method of controlling an image processing apparatus, the method comprising:
   (a) generating a plurality of images having an M-bit depth per pixel by inputting an input image having a bit depth of N bits and clipping M-bit segments from mutually bit different positions, relative to a most significant bit of the N bits, within the N bits;
   (b) generating, by inputting the plurality of images generated in the step (a) into a neural network for an M-bit-depth image, a plurality of output images corresponding to each of the plurality of images being input; and
   (c) generating an image having the N-bit depth from the plurality of output images generated in the step (b),
   wherein the M-bit segments include (1) a first M-bit segment whose most significant bit is the most significant bit of the N bits and (2) a second M-bit segment whose most significant bit is not the most significant bit of the N bits.

11. The apparatus according to claim 1, wherein the second M-bit segment has a most significant bit which is shifted two bits over from the most significant bit of the N bits.

12. The apparatus according to claim 11, wherein the M-bit segments further include a third M-bit segment whose most significant bit is shifted four bits over from the most significant bit of the N bits.

* * * * *